United States Patent
Kapadia et al.

(10) Patent No.: US 11,226,985 B2
(45) Date of Patent: Jan. 18, 2022

(54) REPLICATION OF STRUCTURED DATA RECORDS AMONG PARTITIONED DATA STORAGE SPACES

(71) Applicant: Microsoft Technology Licensing, LLC, Redmond, WA (US)

(72) Inventors: Arshish Kapadia, Issaquah, WA (US); Peter Adam Outcalt, Bellevue, WA (US); Tarkan Sevilmis, Redmond, WA (US); Andre Makram, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 778 days.

(21) Appl. No.: 15/181,751

(22) Filed: Jun. 14, 2016

(65) Prior Publication Data

US 2017/0169091 A1     Jun. 15, 2017

Related U.S. Application Data

(60) Provisional application No. 62/267,307, filed on Dec. 15, 2015, provisional application No. 62/267,311, filed on Dec. 15, 2015.

(51) Int. Cl.
*G06F 16/27* (2019.01)
*G06F 16/22* (2019.01)

(52) U.S. Cl.
CPC ........ *G06F 16/278* (2019.01); *G06F 16/2255* (2019.01); *G06F 16/27* (2019.01)

(58) Field of Classification Search
CPC .............................. G06F 16/273; G06F 16/27
See application file for complete search history.

(56) References Cited

U.S. PATENT DOCUMENTS 5,369,761 A   11/1994   Conley et al.
6,073,129 A    6/2000   Levine et al.
(Continued)

FOREIGN PATENT DOCUMENTS

CN   101410830 A   4/2009
CN   102354289 A   2/2012
(Continued)

OTHER PUBLICATIONS

"Balancing Strong and Eventual Consistency with Google Cloud Datastore", Published on: Sep. 22, 2015, Available at: https://cloud.google.com/datastore/docs/articles/balancing-strong-and-eventual-consistency-with-google-cloud-datastore/.
(Continued)

*Primary Examiner* — Mohammad S Rostami

(57) ABSTRACT

Systems, methods, and software for management of partitioned data storage spaces is provided herein. An exemplary method includes storing sets of structured data records among partitioned data storage spaces, with data fields of the structured data records correlated among the sets by relational associations. The method includes, in a data center that receives change actions related to the structured data records, selectively placing the change actions into a plurality of change feeds, where the change feeds can be commutatively executed in parallel to implement the change actions. The method further includes implementing the change actions and propagating replication data comprising the change actions in the plurality of change feeds.

20 Claims, 12 Drawing Sheets

(56) References Cited

U.S. PATENT DOCUMENTS

| | | |
|---|---|---|
| 6,493,721 B1 | 12/2002 | Getchius et al. |
| 6,553,366 B1 | 4/2003 | Miller et al. |
| 6,898,590 B1 | 5/2005 | Streifer |
| 6,978,281 B1 | 12/2005 | Kruy et al. |
| 7,043,665 B2 | 5/2006 | Kern et al. |
| 7,058,731 B2 | 6/2006 | Kodama |
| 7,058,853 B1 | 6/2006 | Kavanappillil et al. |
| 7,177,866 B2 * | 2/2007 | Holenstein .......... G06F 11/2064 707/615 |
| 7,237,184 B2 | 6/2007 | Ballard et al. |
| 7,305,658 B1 | 12/2007 | Hamilton et al. |
| 7,440,905 B2 | 10/2008 | Ellis et al. |
| 7,447,786 B2 | 11/2008 | Loaiza et al. |
| 7,464,109 B2 | 12/2008 | Modi |
| 7,490,083 B2 | 2/2009 | Bourbonnais et al. |
| 7,523,397 B2 | 4/2009 | Cheung et al. |
| 7,529,784 B2 | 5/2009 | Kavuri et al. |
| 7,774,318 B2 | 8/2010 | Effern |
| 7,783,598 B1 * | 8/2010 | Malaiyandi .......... G06F 16/184 707/610 |
| 7,801,851 B2 | 9/2010 | Holenstein et al. |
| 7,890,545 B1 | 2/2011 | Cason, Jr. |
| 8,037,024 B1 | 10/2011 | Bozkaya et al. |
| 8,051,102 B2 | 11/2011 | Everett |
| 8,280,822 B2 | 10/2012 | McKeown et al. |
| 8,468,170 B2 | 6/2013 | Bybee et al. |
| 8,635,271 B1 * | 1/2014 | Adya .................. H04L 63/0807 709/203 |
| 8,694,472 B2 | 4/2014 | Marshall |
| 8,726,066 B1 | 5/2014 | Natanzon et al. |
| 8,751,863 B2 | 6/2014 | Calder et al. |
| 8,768,905 B2 | 7/2014 | Walker |
| 8,812,564 B2 | 8/2014 | Peh et al. |
| 8,812,897 B1 | 8/2014 | Helmick et al. |
| 8,819,072 B1 | 8/2014 | Croicu et al. |
| 8,850,261 B2 | 9/2014 | Blood et al. |
| 8,880,565 B2 | 11/2014 | Fricke et al. |
| 8,909,977 B2 | 12/2014 | Morosan et al. |
| 8,996,482 B1 | 3/2015 | Singh et al. |
| 9,015,126 B2 | 4/2015 | Rambacher et al. |
| 9,031,932 B2 | 5/2015 | Idicula et al. |
| 9,053,167 B1 | 6/2015 | Swift et al. |
| 9,064,004 B2 | 6/2015 | DeRose |
| 9,083,766 B2 | 7/2015 | Hunter |
| 9,116,862 B1 * | 8/2015 | Rath .................. G06F 11/2097 |
| 9,152,824 B2 | 10/2015 | Lomnes |
| 9,374,475 B1 | 6/2016 | Frazier |
| 9,405,817 B2 | 8/2016 | Ng et al. |
| 9,448,893 B1 * | 9/2016 | Whitehead .......... G06F 16/128 |
| 9,626,394 B2 | 4/2017 | Schmidt et al. |
| 9,632,878 B1 * | 4/2017 | Maccanti .......... G06F 11/1469 |
| 9,892,150 B2 | 2/2018 | Jayanth et al. |
| 10,698,767 B1 * | 6/2020 | De Kadt .......... G06F 11/1471 |
| 2002/0078007 A1 | 6/2002 | Herrero |
| 2004/0015508 A1 * | 1/2004 | Anonsen .......... G06F 16/2315 |
| 2005/0033720 A1 | 2/2005 | Verma et al. |
| 2006/0248295 A1 * | 11/2006 | Uchiyama .......... G06F 11/2058 711/162 |
| 2007/0067354 A1 | 3/2007 | Mullender et al. |
| 2007/0198700 A1 | 8/2007 | Vivian et al. |
| 2007/0233980 A1 * | 10/2007 | Cox .................. G06F 11/2058 711/162 |
| 2007/0234106 A1 * | 10/2007 | Lecrone .......... G06F 11/2058 714/6.12 |
| 2007/0276918 A1 | 11/2007 | Alderson |
| 2007/0282915 A1 * | 12/2007 | Vosshall .......... G06F 16/2455 |
| 2008/0016300 A1 | 1/2008 | Yim et al. |
| 2008/0065655 A1 | 3/2008 | Chakravarthy et al. |
| 2009/0144338 A1 * | 6/2009 | Feng .................. G06F 16/273 |
| 2009/0157684 A1 | 6/2009 | Andersen et al. |
| 2010/0049715 A1 | 2/2010 | Jacobsen et al. |
| 2010/0192077 A1 | 7/2010 | Mochko |
| 2010/0211554 A1 * | 8/2010 | Reid .................. G06F 16/2358 707/703 |
| 2010/0318991 A1 | 12/2010 | Venkitachalam et al. |
| 2011/0078494 A1 | 3/2011 | Maki et al. |
| 2011/0161378 A1 | 6/2011 | Williamson |
| 2011/0276549 A1 * | 11/2011 | Fathalla .......... G06F 16/2315 707/704 |
| 2011/0307663 A1 * | 12/2011 | Kultursay .......... G06F 17/5045 711/125 |
| 2012/0072392 A1 | 3/2012 | Crowhurst et al. |
| 2012/0079222 A1 | 3/2012 | Phelps et al. |
| 2012/0166390 A1 | 6/2012 | Merriman et al. |
| 2012/0192006 A1 | 7/2012 | Qi et al. |
| 2012/0239886 A1 | 9/2012 | Rantanen |
| 2012/0303577 A1 | 11/2012 | Calder et al. |
| 2013/0031403 A1 | 1/2013 | Mordani et al. |
| 2013/0145032 A1 | 6/2013 | Fawcett |
| 2013/0219224 A1 | 8/2013 | Katou |
| 2013/0226882 A1 | 8/2013 | Jaiswal et al. |
| 2014/0143358 A1 | 5/2014 | Beausoleil et al. |
| 2014/0172833 A1 | 6/2014 | Taylor |
| 2014/0181836 A1 * | 6/2014 | Tripp .................. G06F 8/433 718/106 |
| 2015/0026128 A1 | 1/2015 | Drobychev et al. |
| 2015/0106549 A1 | 4/2015 | Brown et al. |
| 2015/0134627 A1 | 5/2015 | Hu et al. |
| 2015/0244795 A1 * | 8/2015 | Cantwell .......... H04L 67/1095 709/202 |
| 2015/0302058 A1 | 10/2015 | Li et al. |
| 2015/0317340 A1 * | 11/2015 | Sardina .......... G06F 16/22 707/803 |
| 2015/0339369 A1 | 11/2015 | Rais-Ghasem et al. |
| 2015/0379099 A1 * | 12/2015 | Vermeulen .......... G06F 16/27 707/634 |
| 2015/0379100 A1 * | 12/2015 | Vermeulen .......... G06F 16/27 707/620 |
| 2016/0086260 A1 * | 3/2016 | Vermeulen .......... G06Q 40/00 705/35 |
| 2016/0171068 A1 * | 6/2016 | Hardin .......... G06F 16/24565 707/610 |
| 2017/0169067 A1 | 6/2017 | Jose et al. |
| 2017/0169087 A1 | 6/2017 | Kapadia et al. |
| 2017/0169090 A1 | 6/2017 | Jose et al. |
| 2017/0169091 A1 | 6/2017 | Kapadia et al. |

FOREIGN PATENT DOCUMENTS

| | | |
|---|---|---|
| CN | 103544303 A | 1/2014 |
| CN | 104303176 A | 1/2015 |
| CN | 104462258 A | 3/2015 |
| EP | 1498815 A2 | 1/2005 |
| WO | 2005046120 A1 | 5/2005 |
| WO | 2011126995 A1 | 10/2011 |

OTHER PUBLICATIONS

Decandia, et al., "Dynamo: Amazon's Highly Available Key-value Store", In Proceedings of twenty-first ACM SIGOPS symposium on Operating systems principles, Oct. 14, 2004, 16 pages.

"Jepsen: MongoDB Stale Reads", Published on: Apr. 20, 2015, Available at: https://aphyr.com/posts/322-call-me-maybe-mongodb-stale-reads.

"Enabling Strong Consistency", Published on: Sep. 7, 2014, Available at: http://docs.basho.com/riak/latest/dev/advanced/strong-consistency/.

Anderson, et al., "CouchDB", Published on: Aug. 29, 2010, Available at: http://guide.couchdb.org/draft/consistency.html.

Terry, Doug, "Replicated Data Consistency Explained Through Baseball", In MSR Technical Report, Oct. 2011, pp. 1-14.

"Eventual Consistency", Published on: Apr. 9, 2013, Available at: https://docs.basho.com/riak/1.3.1/references/appendices/concepts/Eventual-Consistency/.

Elbushra, et al., "Eventual Consistent Databases: State of the Art", In Open Journal of Databases, vol. 1, Issue 1, Retrieved on: Dec. 10, 2015, pp. 26-41.

Feldman, et al., "SPORC: Group Collaboration using Untrusted Cloud Resources", In Proceedings of 9th USENIX Symposium on

(56) References Cited

OTHER PUBLICATIONS

Operating Systems Systems Design and Implementation, Oct. 4, 2010, pp. 1-14.
"TIBCO ActiveSpaces", Published on: Aug. 2014, Available at: https://docs.tibco.com/pub/activespaces/2.1.4/doc/pdf/tib_activespaces_developer.pdf.
"Truecopy Remote Replication", Published on: Apr. 26, 2014, Available at: https://www.hds.com/products/storage-software/truecopy-remote-replication.html.
Ratner, Michael, "The Fundamentals of Hitachi Content Platform", In White Paper, Nov. 2014, 28 pages.
"Second Written Opinion Issued in PCT Application No. PCT/US2016/065220", dated Nov. 6, 2017, 10 Pages.
"Non Final Office Action Issued in U.S. Appl. No. 15/181,690", dated Apr. 19, 2018, 8 Pages.
"Non Final Office Action Issued in U.S. Appl. No. 15/181,717", dated May 10, 2018, 14 Pages.
Frischmuth, et al., "Linked Data In Enterprise Information Integration", Published in Semantic Web Journal, IOS Press, 2012, 17 Pages.
Ng, T. P.., "Propagating Updates in a Highly Replicated Database", In Proceedings of IEEE Sixth International Conference on Data Engineering, Feb. 5, 1990, pp. 529-536.
"International Search Report and Written Opinion Issued in PCT Application No. PCT/US2016/065220", dated Feb. 6, 2017, 14 Pages.
"International Search Report and Written Opinion Received For PCT Application No. PCT/US2016/065221", dated Feb. 20, 2017, 12 Pages.
"International Search Report and Written Opinion Issued in PCT Application No. PCT/US2016/065224", dated Feb. 20, 2017, 12 pages.
Ramakrishnan, et al., "Live Data Center Migration across WANs: A Robust Cooperative Context Aware Approach", In Proceedings of the SIGCOMM workshop on Internet Network Management, Aug. 27, 2007, 6 Pages.
"International Search Report and Written Opinion Issued in PCT Application No. PCT/US2016/065223", dated Apr. 6, 2017, 10 Pages.
"International Preliminary Report on Patentability Issued in PCT Application No. PCT/US2016/1065224", dated Feb. 26, 2018, 7 Pages.
Bailis, et al., "Eventual Consistency Today: Limitations, Extensions, and Beyond", In ACM Queue, vol. 11, Issue 3, Mar. 2013, pp. 1-23.
Anderson, et al., "CouchDB", Published on: Aug. 29, 2010, Available at: http://guide.couchdb.org/draft/consistency.html#consistency.
"Tracking Changes in Change Request Management", Retrieved on: Dec. 10, 2015, Available at: http://help.sap.com/saphelp_sm71_sp01/helpdata/en/4d/6e7c190ceb5dc6e10000000a42189c/content.htm.
Wloka, et al., "Safe-Commit Analysis to Facilitate Team Software Development", In Proceedings of IEEE 31st International Conference on Software Engineering, May 16, 2009, pp. 507-517.
Wiselman, Rayne, "Failover in Site Recovery", Published on: Oct. 1, 2015, Available at: https://azure.microsoft.com/en-in/documentation/articles/site-recovery-failover/.
Smith, et al., "Maximum Availability Architecture", In White Paper of Oracle, Jul. 2010, 23 pages.
Modi, Ritesh, "Azure Site Recovery: Hyper-V to Azure Part-6", Published on: Apr. 24, 2015, Available at: https://automationnext.wordpress.com/category/disaster-recovery/.
Chase, Jeff, "Distributed Systems, Failures, and Consensus", Retrieved From: <<https://www.cs.duke.edu/courses/fall07/cps212/consensus.pdf>>, 79 Pages.
"Second Written Opinion Issued in PCT Application No. PCT/US2016/065224", dated Oct. 9, 2017, 5 Pages.
"Notice of Allowance Issued in U.S. Appl. No. 15/181,717", dated Oct. 31, 2018, 9 Pages.
Brouwer, Peter, "The Art of Data Replication", An Oracle Technical White Paper, Sep. 2011, pp. 1-26.
"International Preliminary Report on Patentability Issued in PCT Application No. PCT/US2016/065221", dated Feb. 1, 2018, 7 Pages.
"Non Final Office Action Issued in U.S. Appl. No. 15/181,799", dated Dec. 31, 2018, 13 Pages.
"Partitioning Data Storage Promote Data Fields Record Updates", Retrieved from: https://scholar.google.com/scholar?hl=en&as_sdt=0%2C47&q=partitioning+data+storage+promote+data+fields+record+updates&btnG=, Retrieved Date: Oct. 15, 2018, 2 Pages.
"Records Partitioning Data Storage Promote Data Fields Update", Retrieved from: https://scholar.google.com/scholar?hl=en&as_sdt=0%2C47&q=records+partitioning+data+storage+promote+data+fields+update&btnG=, Retrieved Date: Oct. 15, 2018, 2 Pages.
"International Preliminary Report on Patentability Issued in PCT Application No. PCT/US2016/065220", dated Mar. 13, 2018, 11 Pages.
"Second Written Opinion Issued in PCT Application No. PCT/US2016/065221", dated Oct. 4, 2017, 7 Pages.
"Database Design and Denormalizing for Performance", Published on: Jan. 29, 2004 Available at: http://www.lcard.ru/~nail/sybase/perf/1088.htm.
Mullins, Craig, "Denormalization Guidelines", Published on: Jun. 1, 1997 Available at: http://tdan.com/denormalization-guidelines/4142.
Downs, Kenneth, "Denormalization Patterns", Published on: Apr. 27, 2008 Available at: http://database-programmer.blogspot.in/2008/04/denormalization-patterns.html.
"High Performance Data Warehousing", Published on: Mar. 22, 2006 Available at: http://www.dba-oracle.com/tp_relational_databases_denormalization_batch_updating.htm.
Green, Steven, "How Denormalization Works in a col. Data Store", Published on: Jul. 6, 2011 Available at: http://www.sand.com/denormalization-works-column-data-store/.
"Optimizing the Database Design by Denormalizing", Published on: Jun. 11, 2014 Available at: https://msdn.microsoft.com/en-us/library/cc505841.aspx.
Chapple, Mike, "Should I Normalize My Database?", Published on: Jun. 7, 2011 Available at: http://databases.about.com/od/specificproducts/a/Should-1-Normalize-My-Database.htm.
"Denormalizing a Relational Database for Performance", Published on: Dec. 19, 2010 Available at: http://oracledba.ezpowell.com/oracle/papers/Denormalization.htm.
"Office Action Issued in European Patent Application No. 16823086.0", dated Jul. 15, 2019, 6 Pages.
"Final Office Action Issued in U.S. Appl. No. 15/181,799", dated Apr. 19, 2019, 12 Pages.
"Advisory Action Issued in U.S. Appl. No. 15/181,799", dated Aug. 7, 2019, 6 Pages.
"List of Job Scheduler Software", Retrieved from: https://en.wikipedia.org/w/index.php?title=List_of_job_scheduler_software&oldid=692899188#Event_driven, Nov. 29, 2015, 06 Pages.
"Office Action Issued in European Patent Application No. 16813208.2", dated Feb. 6, 2020, 08 Pages.
"Office Action Issued in European Patent Application No. 16816133.9", dated Feb. 3, 2020, 08 Pages.
"Office Action Issued in European Patent Application No. 16820057.4", dated Feb. 10, 2020, 07 Pages.
"Summons to Attend Oral Proceedings Issued in European Patent Application No. 16823086.0", dated Mar. 4, 2020, 08 Pages.
Giannetti, Fabio, "A Multi-format Variable Data Template Wrapper Extending PODi's PPML-T Standard", In Proceedings of the ACM Symposium on Document Engineering, Aug. 28, 2007, pp. 37-43.
Wei, et al., "Verifying Data Migration Correctness: The Checksum Principle", In Research Report of RTI Press, Mar. 21, 2014, 12 Pages.
"Lock (Computer Science)", Retrieved from: https://en.wikipedia.org/w/index.php?title=Lock_(computer_science) &oldid=715530007, Retrieved on Aug. 25, 2020, 8 Pages.
"Summons to Attend Oral Proceedings Issued in European Patent Application No. 16813208.2", dated Sep. 1, 2020, 11 Pages.

(56) References Cited

OTHER PUBLICATIONS

"Summons to Attend Oral Proceedings Issued in European Patent Application No. 16820057.4", dated Sep. 1, 2020, 9 Pages.
"Summons to Attend Oral Proceedings Issued in European Patent Application No. 16823086.0", dated Oct. 30, 2020, 9 Pages.
"First Office Action and Search Report Issued in China Patent Application No. 201680073896.3", dated Jul. 5, 2021, 17 Pages.
"First Office Action and Search Report Issued in China Patent Application No. 201680073900.6", dated Jun. 24, 2021, 11 Pages.
Wan, et al., "Actual Combat Detailed Explanation for In-Depth Cloud Computing Hadoop Application and Development", In China Railway Publishing House, Jun. 30, 2013, 6 Pages.
"First Office Action and Search Report Issued in China Patent Application No. 201680074237.1", dated Jul. 2, 2021, 12 Pages.
Jing, et al., "Scalable Storage Space Management Method to Support EB-Scale Storage", In Journal of Computer Research and Development, vol. 50, Issue 8, Dec. 31, 2013, pp. 1573-1582.
"Office Action Issued in Indian Patent Application No. 201847019638", dated Apr. 15, 2021, 7 Pages.
"Office Action and Search Report Issued in Chinese Patent Application No. 201680074806 2", dated Mar. 25, 2021, 14 Pages.
"Summons to Attend Oral Proceedings Issued in European Patent Application No. 16816133.9", Mailed Date: Feb. 19, 2021, 11 Pages.
"Office Action Issued in Indian Patent Application No. 201847019645", dated Oct. 12, 2021, 8 Pages.

\* cited by examiner

REPLICATION OF STRUCTURED DATA RECORDS AMONG PARTITIONED DATA STORAGE SPACES

RELATED APPLICATIONS

This application hereby claims the benefit of priority to U.S. Provisional Patent Application 62/267,307, titled "REPLICATION ORDERING IN A CROSS-DOCUMENT EVENTUAL CONSISTENCY SYSTEM," filed Dec. 15, 2015, and U.S. Provisional Patent Application 62/267,311, titled "IMMEDIATE AND EVENTUAL VERIFICATIONS IN MULTI-DOCUMENT REPLICATION," filed Dec. 15, 2015, which are hereby incorporated by reference in their entirety.

BACKGROUND

Data storage systems can include various data structures to hold and relate data records, such as databases, tables, and other data structures. Structured query languages (SQL) can be used in relational database management systems (RDBMS) to query various data structures. Non-relational databases, such as schemaless or NoSQL-type databases, allow for various flexibility as compared to SQL-based data. NoSQL databases can store data in one or more tables and use updating processes which may not provide immediate data coherency throughout an entire database system. However, these NoSQL databases can be better suited for distributed storage systems, such as cloud storage systems, multi-data center systems, among other redundant and non-local data storage systems.

OVERVIEW

Systems, methods, and software for management of partitioned data storage spaces is provided herein. An exemplary method includes storing sets of structured data records among partitioned data storage spaces, with data fields of the structured data records correlated among the sets by relational associations. The method includes, in a data center that receives change actions related to the structured data records, selectively placing the change actions into a plurality of change feeds, where the change feeds can be commutatively executed in parallel to implement the change actions. The method further includes implementing the change actions and propagating replication data comprising the change actions in the plurality of change feeds.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
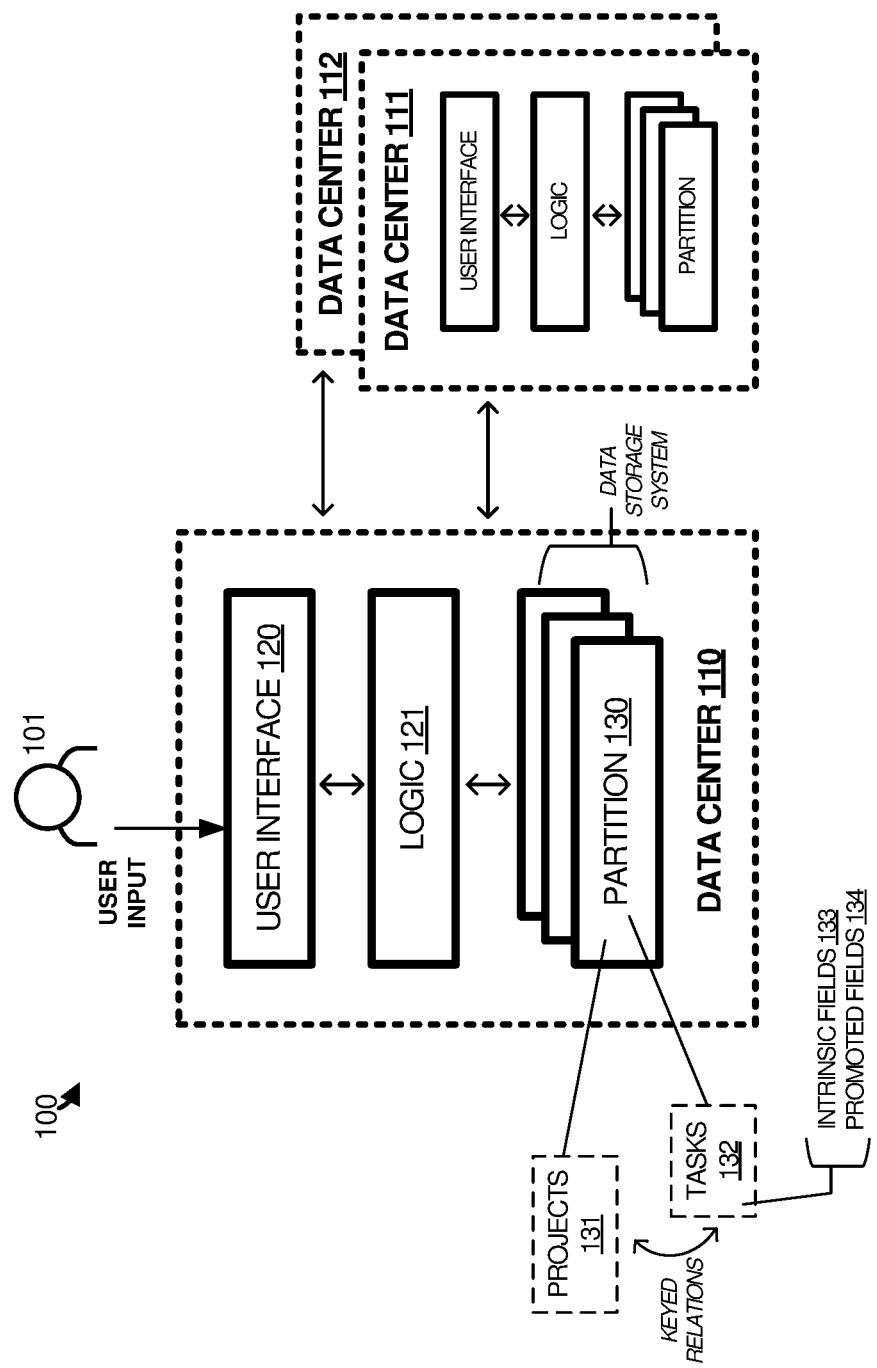
FIG. 1 illustrates a data storage environment in an example.

Non-relational databases, such as schemaless or NoSQL-type databases, allow for various flexibility as compared to SQL-based data. NoSQL databases can store data in one or more tables and use "eventually consistent" processes which may not provide immediate data coherency throughout an entire database system. In the examples below, various views are pre-computed to store data records in one or more tables. These views can arrange a data set comprising data records into different configurations, and can be stored in different data partitions. The pre-computed views can speed up access to databases for response to queries, as compared to SQL-based databases which typically require 'JOIN' or other functions acting on a single data set or view. When changes are made to the data records in the NoSQL databases discussed herein, such as altering existing data records, deleting data records, or adding new data records, the various views are updated to reflect the changes. The update process takes time to complete, and the various views eventually become consistent with one another responsive to the changes. Therefore, changes made in one view might not propagate fully to all other views or data records immediately.

Various user-facing applications can employ these database systems, such as software for project management, planning, task management, calendars, or other types of software. Any distributed data service can also employ these database systems. The database systems contain databases or data sets for which pre-computed views can be established. Although any data can be held in the associated databases, many of the examples herein discuss the context of projects and tasks to illustrate various enhanced features. In project management or task management examples, projects can include one or more tasks which are to be completed for the project. Arrangements of the projects and tasks can be established using structured data records which are related to each other using keyed data or other relationships.

A normalized data storage system is one in which only one copy of the data is kept, and indices are built above it to facilitate queries. By contrast, in a denormalized data storage system, the entire document or parts of the document are replicated multiple times in 'views,' with each replica indexed differently to support a corresponding query. For example, in a system representing projects and associated tasks, the system may serve the queries: "What Tasks are in this Project?" as well as "What Tasks are assigned to this User?" To service these queries, a denormalized storage system could store views of "Tasks Indexed by Project" and "Tasks Indexed by Assigned User," both of which would have the entire task document.

This can lead to difficulties when developers using the system wish to create experiences that are logical "joins" of the data, which cannot be served by a single index. In our example, such a query might be: "What are the names of the Projects for each Task assigned to this User?" In a normalized system, this is a straightforward query, because the indices can be 'joined,' as normalized transactional systems are nearly always on "localized" (non-distributed) hardware to facilitate transactions. For example, they are usually on a single computer or perhaps even the same physical hard drive.

Since denormalized storage systems are built for scale, they usually have replicated indexed data spread over many machines in a distributed fashion. In a denormalized system, retrieving the tasks for a user can done as a single query to "Tasks Indexed by Assigned User," but finding the project name for each task is a lookup operation for each task, and since the projects may be distributed across different physical nodes, running all of these queries may be expensive in terms of computational and transactional effort.

Normalized systems can be undesirable because normalized systems have a single transaction system, which becomes a bottleneck in large-scale deployments. Other systems use denormalized storage, but build a new denormalized index or view for every possible query. This can quickly grow to a large number of possible queries. While these implementations can be done in parallel, the amount of storage required increases cost, space, time, and can decrease storage and computing efficiency in distributed systems. A third implementation uses fan-out queries, achieving "joining" of data by reading all data from separate data stores. This slows down the servicing of a query, because the query takes as long as the maximum duration of a sub-query. The associated systems also become less reliable as many queries need to be successfully executed.

The examples discussed herein greatly extend the scope of queries that can be serviced by a system by putting properties of an entity onto other entities related by associations by using promoted data fields. An association may be similar to containment, linking, membership, or any other relationship. Putting the property onto another object is called "promoting the property" herein, and the properties themselves are "promoted properties." The examples discussed herein also allow for aggregating information across relationships, such as maintaining the count of the number of entities in a certain relationship, or taking the sum of the values of some field of entities in a relationship, among other aggregated information. Properties like this can be called "aggregated properties."

In a system that maintains task and project data, the tasks can be denormalized with an associated project name, so that the project name is available in any query where the task is available. Similarly, the project can keep a count of the number of tasks that the project contains. In this way, the data is similar to "pre-joined" data before the data is deposited in the denormalized indices.

Promoted properties can be promoted 'to' an entity on each edit, creation, or deletion of the entity. Example processes include (1) reading the associated entities to find any properties that must be promoted to the modified entity, (2) augmenting the entity with the properties to be promoted, (3) copying the entity to all denormalized copies of the entity, (4) removing any obsolete copies of the entity, and (5) verifying that none of the associated entities have changed since step 1. If they have, the process can return to step 1. Promoted properties can be promoted 'from' an entity on each edit, creation, or deletion of the entity. Example processes include (1) finding the entities which are no longer associated with the entity, (2) removing the promotion from those entities, and (3) finding the entities which are still associated with the entity, or newly associated with the entity, and (4) updating the entities with the modified properties.

Aggregated properties can be replicated on each edit, creation, or deletion of an entity. Example processes include (1) finding newly associated entities, taking a promoted properties-specific exclusive lock on each, and adding the aggregate to those entities. The exclusive lock is necessary because only the modified entity is locked, and no user-facing lock is taken on the associated entities at any point. The example process also includes (2) finding entities that have their association removed by the edit, taking a promoted properties-specific exclusive lock on each, and subtracting the aggregate from those entities. Aggregate properties can pose special concerns for retriability of edits in storage systems, because retrying addition and subtraction is not idempotent. To help with this problem, when the edit is registered, a unique key can be associated with the edit. Before applying the edit, the old value of the aggregate property can be stored when the exclusive lock is registered. Then, if a subsequent edit finds the expired lock, it must restore the previous value before obtaining a new exclusive lock.

Various improvements to data record handling using promoted properties, and data center management technology may be appreciated from the implementations herein. The ability of data center management systems to handle data record queries with fewer individual queries provides for enhanced operation of any associated data records, databases, and user interaction. Technical effects improve the functioning of computer and computer systems which might include databases, applications (such as project management applications), and data storage systems. This provides various technical effects and advantages of decreasing the response time of data storage systems, reducing processor load of data storage systems, and increasing code execution efficiency with associated applications.

As a first example of a data system, FIG. 1 is presented. FIG. 1 illustrates data storage environment 100. Environment 100 includes a plurality of data centers 110-112 which can provide data services to user 101. User 101 can interface with data center 110 in this example via user interface 120. Data center 110 also includes logic 121 which implements instructions issued by users, such as user input by user 101. Logic 121 also manages data stored in one or more partitions 130 which store one or more sets of structured data records. Each of the data centers in FIG. 1 can include similar elements as data center 110.

Partitions 130 include one or more data arrays, such as sets of structured data records, pre-computed views, rows of data, tables of data, or other data structures. In FIG. 1, an example data type is shown for a project management configuration, although other configurations are possible. Projects 131 can relate to any number of tasks 132. Further distinctions can be made, such as for individual users assigned to tasks on a particular project. Thus, many projects can be stored in individual partitions, with each of the projects having properties held in data fields which can relate or be correlated to other data fields associated with users, tasks, or other items.

Data elements discussed herein, such as data records, can include intrinsic fields, promoted fields, and aggregate fields, among others. For example, tasks 132 can each comprise intrinsic fields 133 and promoted fields 134. Promoted data fields reference properties of data fields of at least another set of data records, and in some examples comprise information or values included in a data record of the other set of data records. Intrinsic fields relate to data fields of each task which correspond to that particular task, such as task name or other task properties. In contrast to promoted data fields, intrinsic data fields do not reference properties of data fields in another set of data records. Aggregate data can comprise computed fields, such as fields which represent aggregated properties of other fields. In one example, an aggregate data value indicates a total number of project records or total number of task records, and is re-computed responsive to a change in quantity of task records or project records.

As mentioned above, promoted fields relate to data fields of other tables or data structures, such as projects 131. For example, each task can have one or more additional data fields which indicate a property of projects 131, such as a project name to which the particular task is assigned. When lookups or queries are performed to retrieve the tasks, the intrinsic fields and promoted fields are provided responsive to the lookup or query. This can save additional processing time and lookup delays since a query for a task will also provide an indication for other 'elevated' properties or data fields from another foreign data structure.

Returning to the elements of FIG. 1, data centers 110-112 can be located at different physical or geographic locations, and coupled over one or more network links and packet networks. Data centers 110-112 each comprise computer processing systems and equipment to receive data, store data, and process data, among other operations discussed herein. Data centers 110-112 each can include communication or network interfaces, user interfaces, as well as computer systems, microprocessors, circuitry, cloud-based systems, or some other processing devices or software systems, and can be distributed among multiple processing devices. Examples of data centers 110-112 can also include software such as an operating system, databases, utilities, drivers, networking software, and other software or data structures stored on one or more computer-readable media. In some examples, data centers 110-112 each include elements discussed below in FIG. 11.

The elements of FIG. 1 can comprise a cloud storage platform, such as used for storage and synchronization of data across various devices, storage systems, services, and other elements, including administration, maintenance, and development systems. The elements of FIG. 1 can comprise execution platforms such platform as a service (PaaS) systems or infrastructure as a service (IaaS) systems to provide virtualized and distributed application-level services to end users. Example platforms for cloud storage and application-level services include Microsoft Azure®, Microsoft SharePoint®, Microsoft Office 365®, Microsoft OneDrive®, Google Drive®, Apple iCloud®, and Dropbox™, among others. However, in at least the examples herein, various improvements are discussed which provide for enhanced management of sets of data records in eventually consistent data systems.

User interface 120 receives user input over one or more network links. The user input is translated into one or more actions for execution by logic 121 which can be interpreted by further elements, such as operating systems or applications. A graphical or textual user interface can be presented to user 101 that comprises one or more graphical or textual user interface elements which are presented to a user for interacting with the elements of data centers 110-112, among other data centers. Application programming interfaces (APIs) can also be provided by user interface 120 for receiving user input, user instructions, change actions, data, data records, queries, searches, or other user input. User interface 120 can also include various output elements for indicating data records or operational results to a user.

Logic 121 includes processing circuitry and storage systems. Logic 121 can comprise one or more microprocessors and other processing circuitry that retrieves and executes software from storage systems. Logic 121 can be implemented within a single processing device but can also be distributed across multiple processing devices or sub-systems that cooperate in executing program instructions. Examples of logic 121 include general purpose central processing units, application specific processors, and logic devices, as well as any other type of processing device, combinations, or variations thereof. In some examples, portions of logic 121 are physically separate from some elements of the data centers and are included in remote servers, cloud-based processing systems, or virtualized computing systems.

Partitions 130 are included on one or more data storage systems of each data center. The data storage systems can comprise any computer readable storage media capable of storing data records. The data storage systems can also include data structures which include one or more databases, tables, lists, set of data records, or other data structures, including combinations and variations thereof. The data storage systems can include volatile and nonvolatile, removable and non-removable media implemented in any method or technology for storage of information, such as computer readable instructions, data structures, program modules, or other data. In no case is the computer readable storage media a propagated signal.

Figure 2:
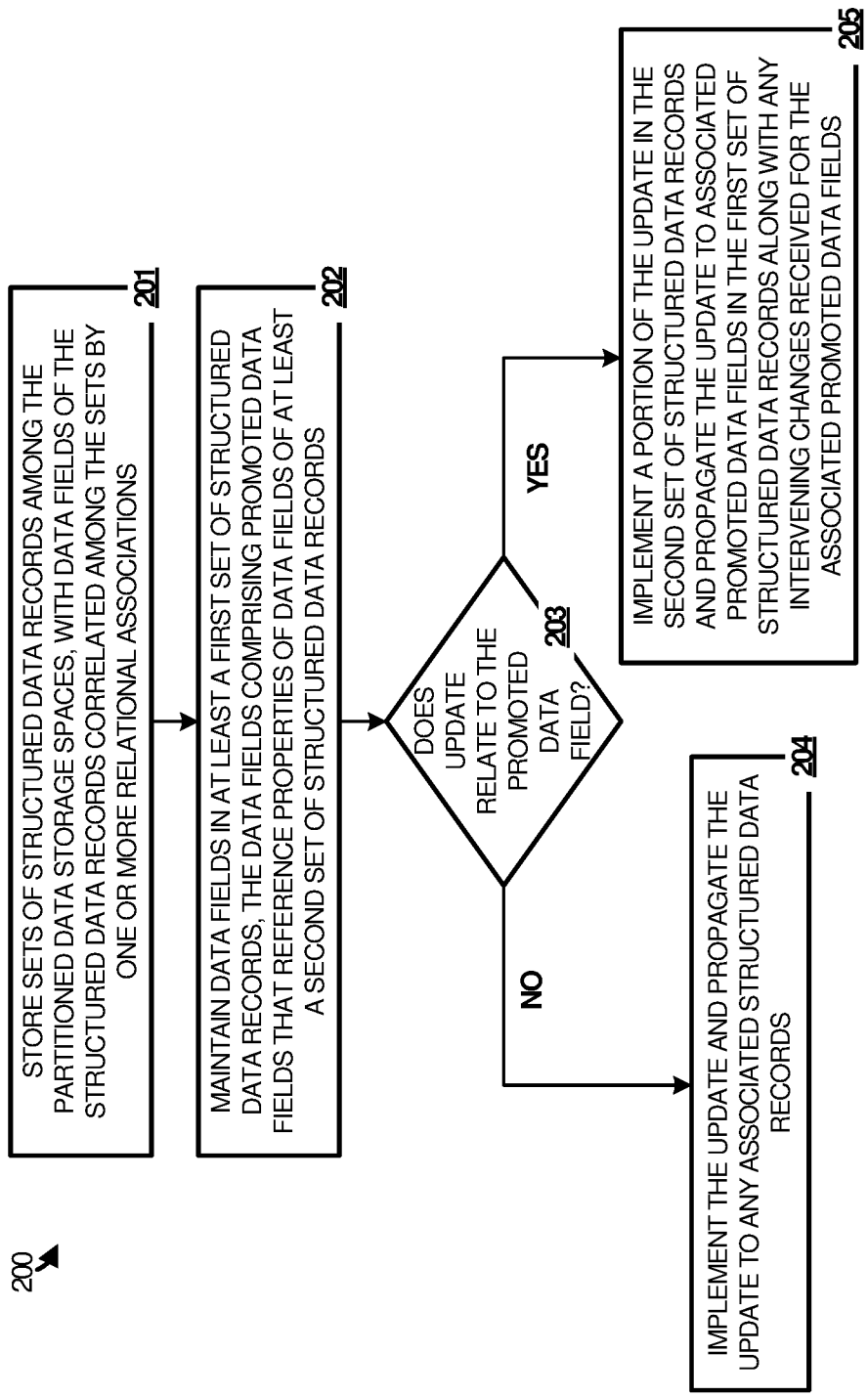
FIG. 2 illustrates a method of handling data records in an example.

A further discussion of promoted properties is included in FIG. 2. FIG. 2 is a flow diagram illustrating an example method of operating the elements of claim 1. The operations of FIG. 2 can be performed by elements of data centers 110-112, such as user interface 120, logic 121, data storage elements, or other associated elements. In FIG. 2, data centers 110-112 store (201) sets of structured data records among the partitioned data storage spaces, with data fields of the structured data records correlated among the sets by one or more relational associations. In a specific example, FIG. 1 shows projects 131 and tasks 132, where each project can have one or more tasks assigned thereto. Views of this data can be computed and stored in the associate data centers, where the views comprise various representations of the underlying data. Other data types and relationships are possible. The structured data records can comprise tables, databases, or other structured data. When tables are employed, record-and-field type designations are typically used, but row-and-column designations can be employed in some examples.

Data centers 110-112 maintain (202) these data fields in sets of structured data records, such as a first set and a second set. The sets of structured data records can be stored by any of data centers 110-112, in any of the associated partitions. Thus, the sets of structured data records can be distributed among the various storage spaces provided by any of data centers 110-112. In some examples, such as when views are employed, each view can be stored on a different partition or different data center. In other examples, a set of views is replicated across more than one partition or data center for redundancy, failover, or to speed up access to the associated data.

The data fields comprise promoted data fields that reference properties of data fields of at least another set of structured data records. In some examples, promoted data fields comprise information or values included in a data record of the other set of data records, but can include aggregate data. Aggregate data can comprise computed data, such as data which represents aggregated properties of other fields. In one example, an aggregate data field indicates a total number of project records or total number of task records, and is re-computed responsive to a change in quantity of task records or project records.

Data centers 110-112 monitor for user interaction, such as user updates to data maintained by data centers 110-112. In FIG. 1, an associated user interface is employed to monitor the user interactions and to provide graphical, text-based, or network-based user interfaces. When user updates occur, data centers 110-112 determine (203) if the user updates relate to promoted data fields. When the user updates do not relate to promoted data fields, then data centers 110-112 implement (204) the updates and propagate the updates to any associated structured data records.

When the user updates relate to promoted data fields, then data centers 110-112 implement (205) a portion of the update in the second set of structured data records and propagate the update to associated promoted data fields in the first set of structured data records along with any intervening changes received for the associated promoted data fields. Intervening changes can occur when a user makes further changes to the data that the promoted data fields reference, such as when a multi-user environment is provided by data centers 110-112. The intervening changes can be incorporated to ensure that updates made to the fields, properties, or data referenced by the promoted data fields are properly propagated to the promoted data fields.

The usage of promoted data fields can advantageously reduce a quantity of queries that need to be performed to retrieve data or records. Moreover, the processing workload for data centers 110-112 is reduced when data employs promoted data fields. Specifically, a query for data records with promoted data fields will return the data included in the promoted data fields. When the promoted data fields contain information or properties of other views or data sets, then multiple queries to those views or data sets can be avoided. In examples where promoted data fields are not employed, multiple queries or JOIN functions might be required to return the data desired by a user.

Figure 3:
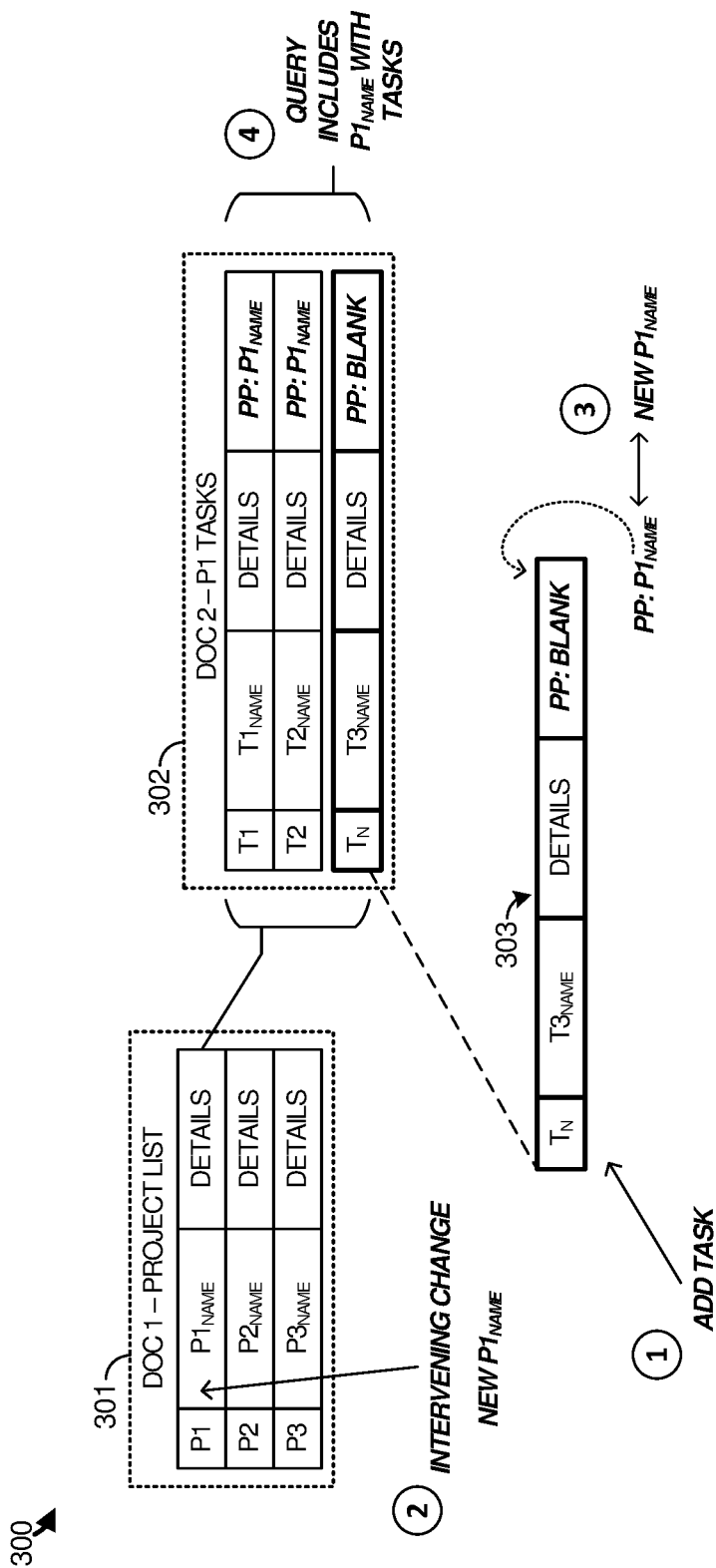
FIG. 3 illustrates views of data records in an example.

A further discussion of promoted properties is included in FIG. 3. FIG. 3 is logical diagram 300 illustrating relationships between various sets of structured data records, which in FIG. 3 are referred to as documents. Other logical groups of sets of structured data records can be employed instead of sets of structured data records.

FIG. 3 illustrates a method of managing data coherency among partitioned data storage spaces. The method includes storing sets of structured data records among partitioned data storage spaces, with fields of the structured data records correlated among the sets by one or more relational associations. The method also includes maintaining promoted data fields in a second set of structured data records that reference properties of a first set of structured data records. Responsive to a user instruction to add a new entry into the first set, the method includes adding a model data record in the second set to hold a position for the new entry, establishing values for fields of the model data record that reflects the new entry, and propagating the values to the model data record in the second set merged with any intervening changes to the promoted data fields that affect the model data record. The values for fields of the model data record can be initially established in a journal data structure.

Another example method includes storing sets of structured data records among the partitioned data storage spaces, with fields of the structured data records correlated among the sets by one or more relational associations, and maintaining promoted data fields in at least a first set of structured data records that reference properties of fields of at least a second set of structured data records. Responsive to a user instruction to update at least a field of a first structured data record in the partitioned data storage spaces, the method includes determining if the update relates to a promoted data field. Based on the update not relating to the promoted data field, the method includes implementing the update and propagating the update to any associated ones of the structured data records. Based on the update relating to the promoted data field, the method includes implementing a portion of the update in the second set of structured data records and propagating the update to associated promoted data fields in the first set of structured data records along with any intervening changes received for the associated promoted data fields.

In FIG. 3, document 301 includes a set of structured data records which comprises a listing of projects managed by a particular project management software environment. Three example projects, P1-P3, are listed in document 301, with each project having intrinsic fields related to project identifiers (P1, P2, P3), intrinsic fields related to project names (P1$_{NAME}$, P2$_{NAME}$, P3$_{NAME}$), and project details which represent further intrinsic fields, such as project descriptions.

Project P1 is shown in a detailed view as being associated with at least two tasks, namely tasks T1 and T2. These tasks can be included in a further set of structured data records, namely document 302. Two example tasks, T1-T2, are listed in document 302, with each task having intrinsic fields related to task numbers (T1, T2), task names (T1$_{NAME}$, T2$_{NAME}$), and task details which represent further intrinsic fields, such as task descriptions. Furthermore, each task in document 302 includes at least one promoted field or promoted property, indicated by a PP designator. These promoted properties indicate a name of a project to which the task is assigned, such as P1$_{NAME}$, in the present example. Alternatively, a project identifier or other project properties can be included in tasks as a promoted property instead of a project name. The promoted property in this example allows any query to retrieve a task or task properties to also automatically retrieve the project name to which the task is assigned. In systems where promoted properties are not employed, a first N number of queries or searches are performed to find associated project names, followed by subsequent queries or searches among associated projects, such as among document 301. Advantageously, using promoted properties, fewer queries can be performed and faster data retrieval and analysis can occur.

FIG. 3 also shows a brief procedure to add additional data records with promoted properties. Specifically, operation '1' in FIG. 3 shows an add task operation, which can be initiated by a user, such as user 101 of FIG. 1 or logic 121 of FIG. 1. This add task operation first prompts logic 121 to add a model or placeholder data record into document 302 for new task 303. The promoted property is typically not immediately resolved or known during task addition, so the model data record is created with a blank promoted property. For example, a new task might first be created and then that task is subsequently assigned to a project. The project name, as the promoted property, can be included in the new task once the task is assigned to a project. If an intervening change, indicated by operation '2' of FIG. 3, occurs, which might affect the promoted property, then that change can be successfully incorporated into the new task record and data coherency between the project list and the task list can be maintained. Specifically, if operation '2' comprises a rename operation for a project to which the new task is assigned, then the promoted property field of the new task data record will reflect the new project name once the project name is placed into the promoted property field of the model data record created for the new task in document 302. Operation '3' reflects an update process for task 203 to update the blank placeholder project name entry with the name from the intervening change in operation '2'—namely the new $P1_{NAME}$.

Advantageously, queries to document 302 can be more efficient with promoted properties. Specifically, operation '4' indicates a query to retrieve document 302 or a subset of tasks in document 302. This query will automatically return the project associated with each task due to the use of promoted properties in the task records. A query for task T1 will return properties/fields of task T1 along with a promoted property relating to properties of another view or document, namely a project name associated with task T1 in this example. Other queries can be performed, such as one for new task 303 which will return properties/fields of task 303 along with a promoted property relating to a project name associated with task 303. Updates to the fields that are referenced by the promoted properties is propagated to the promoted properties fields and thus are reflected in queries to the task records. In examples where promoted properties are not employed, multiple queries or JOIN functions might be required to return a project name associated with a task.

Figure 4:
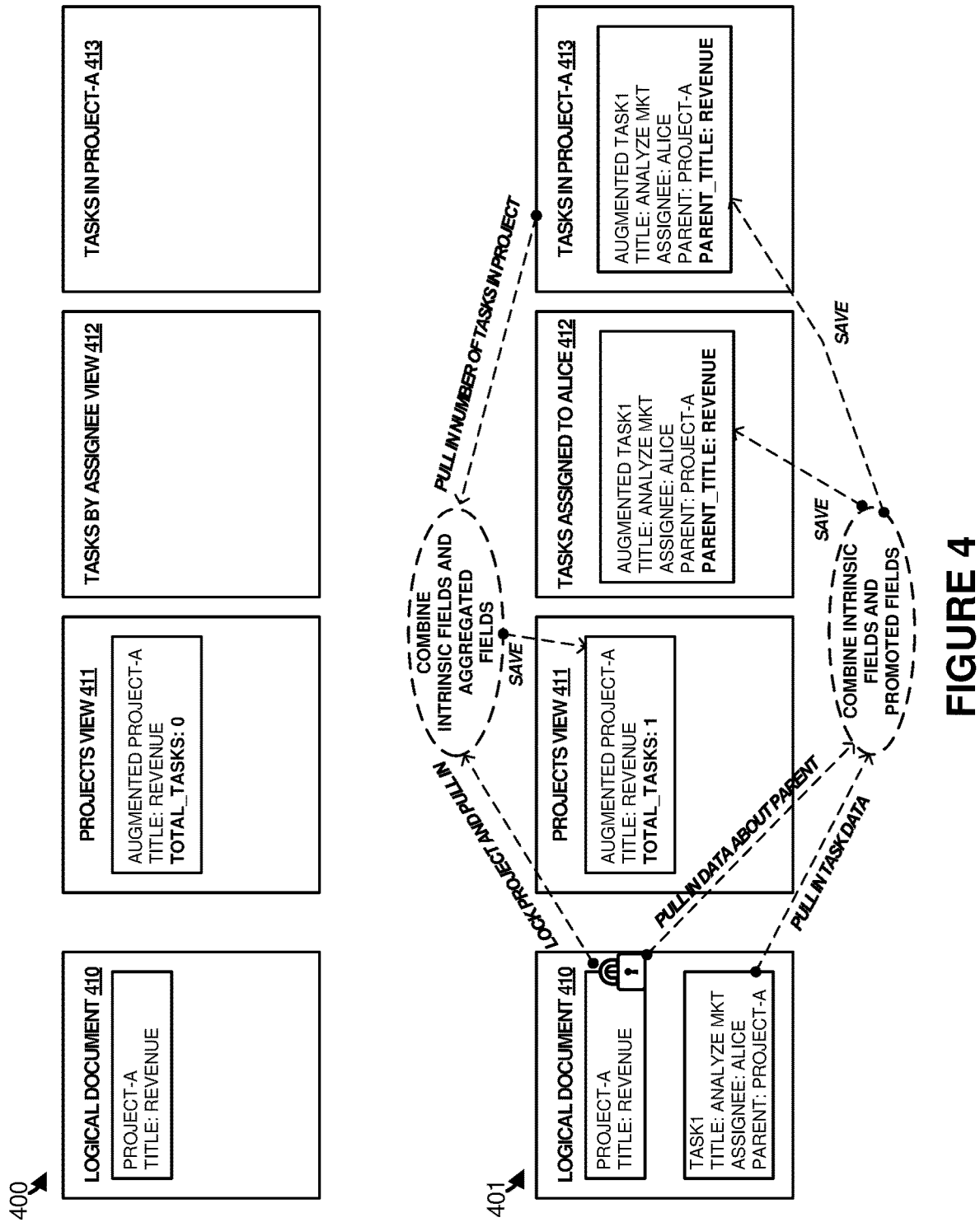
FIG. 4 illustrates handling promoted properties in data records in an example.

FIG. 4 illustrates further examples and operational scenarios of promoted properties in eventually consistent systems, such as illustrated in FIG. 1. In FIG. 4, user-editable properties are homed in one document. This is a way to have the properties show up in other documents for read operations, so that a query that might require multiple reads can be done in a single read. For example, the title of a project can be promoted (via usage of a promoted property field) to a task in that project, so that the project title is retrieved without additional processing or time cost when the task is read.

In FIG. 4, a process is detailed in operational scenarios 400 and 401 which (1) select properties of an entity are copied to other entities related by associations; (2) updates to those properties update the copies on the related entities; and (3) properties are appropriately updated as associations are created or broken. Specifically, operational scenario 400 shows logical project document 410 and several views 411-413, one of which contains project data (411). View 411 contains augmented data, which in this case includes the total number of tasks in the project, currently 0. This is an aggregated property that is not a user-settable property of the project and is instead calculated based on properties of the project.

In operational scenario 401, Task1 is created in Project-A. The aggregated Total_Tasks property is responsively calculated and updated. A lock is placed on Project-A during this process. The lock is only on the aggregate properties, and user-editable properties are still editable during this lock. When Task1 is replicated to the respective views, the augmenting property Parent_Title is computed and copied to the respective views, such as illustrated for views 412 and 413.

Figure 5:
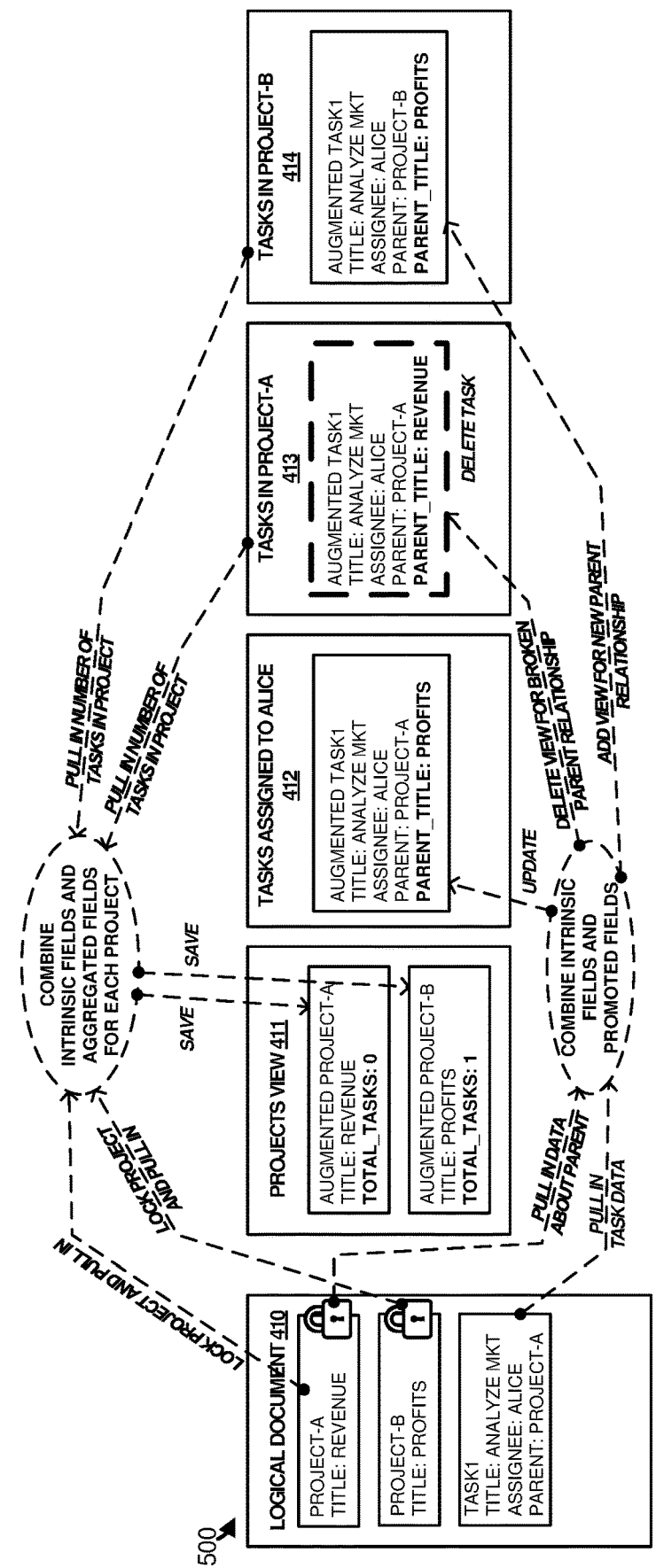
FIG. 5 illustrates handling promoted properties in data records in an example.

FIG. 5 continues the example of FIG. 4. In operational scenario 500 in FIG. 5, a new project (Project-B) has been created in logical document 410, and Task1 has been moved from Project-A to Project-B. Aggregate properties are re-computed, and obsolete copies of Task1 in views are removed.

Turning now to a discussion regarding propagating changes to data sets, FIGS. 6-9 will be discussed. In eventually-consistent data storage systems, tradeoffs must be made between performance and functionality when making edits to data records. When a user makes an edit to an entity, such as data records, the system must prevent another user from making a conflicting edit at the same time. This can be done with either optimistic resource locking, where simultaneous edits result in a conflict error, or in pessimistic resource locking, where the user gets a resource lock first before submitting a change. In both cases, the scope of the resource lock determines the breadth of the edit. For example, in a system representing projects and their constituent tasks, when a task is updated, the system may take a resource lock at the task level (a narrow resource lock) or at the scope of the entire project (a broad resource lock). A broad resource lock allows for sophisticated edits that span entities, but forces edits which might have been parallel to instead be restricted to serial edits.

Narrow resource locks can provide for higher throughput than broad resource locks. However, narrow locks can hinder operations that cascade across documents, like cascading deletes. Relatedly, there are some edits which have follow-up work that must be done after a certain period of time. For example, a service may wish to retain deleted documents for some measure of time, such as a number of days, allowing for "recycle bin" or "trash" functionality, and permanently delete the item after it has been in the recycle bin for several days. In many unindexed storage systems, like key-value storage systems, finding items which have been "recycled" for a given amount of time can be very expensive.

Some systems use broader lock schemes and accept a throughput penalty, or use processes that scan all data records looking for states that indicate work needs to be done. The examples herein provide enhanced operations using reminders. When an edit is submitted, reminders can be added to a "reminder list" to be followed up on later. A first example reminder is "remove this data record from the recycle bin in 30 days, if it is still there." This first example reminder provides for deferring follow-up work for user edits/actions. A second example reminder is "If this Task is in a Project that has been deleted, delete the task." This second example reminder can help with cascading effects beyond the transaction scope. The actions to be taken by the example reminders and associated system allow for automated conflict resolution. For instance, in handling the rule "If this Task is in a Project that has been deleted, delete the task," the task deletion process can proceed regardless of any intervening edits to the task. Advantageously, the reminder list and associated operations can avoid data locking and data locking throughput penalties.

The examples herein can provide enhanced operations for scheduling deletion or purging of data records to meet regulatory and compliance requirements around data retention. In some implementations, various certifications and levels of compliance where customers such as governments, regulated industries, and the like, desire that data or data records be retained for 'x' amount of days and purged within 'y' amount of days. Advantageously, the reminders and reminder lists employed herein can provide these data record handling features for various customer needs in a NoSQL environment. Auditing of compliance procedures can also be provided via the reminder lists which are queryable to determine associated data retention and purging schedules.

The reminder list comprises a listing of work that is queryable by times when the follow-up actions are scheduled to occur. To service queries, the reminder list might be associated with a single index, or might be associated with an index in each shard of some partitioning of the entities being edited. A background process can periodically check the index for reminders that should be executed now or within a predetermined time frame. This background process can evaluate the state of the system, possibly across multiple documents, reach a decision on whether to execute the rule, and then execute (or not execute if appropriate). Once executed, the reminders can be deleted, and the next reminders to be executed are always conveniently available from the index.

The process executing reminders makes decisions regarding multiple objects, but in the examples herein, does not enable locks on all of the multiple objects. In a first example that prevents multiple locks, the system might ensure that the objects being acted on are not editable due to an associated state. For example, if an associated rule is to purge the recycle bin, the system can ensure that no other processes can edit entities in the recycle bin. In a second example that prevents multiple locks, the system might put an optimistic concurrency tag (which can be called an "eTag") of the object into the reminder. If the eTag is no longer valid, then the process executing reminders can skip the operation or alert a user. For follow-up work, the process might make a best effort to submit an edit, and ignore possibly conflicting edits.

Various improvements to data manipulation operations, data set locking, and data center management technology may be appreciated from the foregoing examples. The ability of data center management systems to handle data locking and data set changes efficiently using reminder-based processing provides for enhanced operation of any associated data records, databases, and user interaction. Technical effects improve the functioning of computer and computer systems which might include databases, applications (such as project management applications), and data storage systems. This provides various technical effects and advantages by increasing the response time of data storage systems and reducing processor load and more efficient code execution for associated applications.

Figure 6:
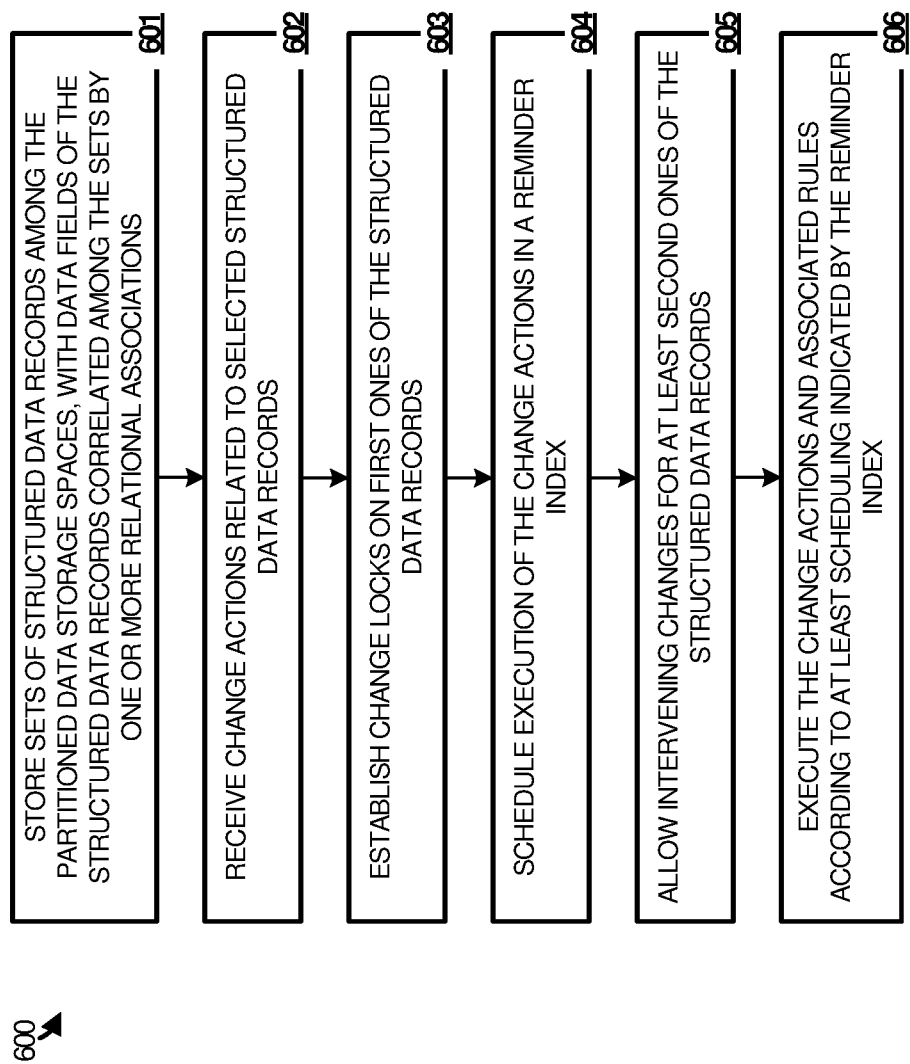
FIG. 6 illustrates change reminders in data records in an example.

FIG. 6 illustrates an example method 600 of managing changes among partitioned data storage spaces using reminders. FIG. 6 illustrates reminders for processing in eventually consistent systems, and can be implemented on any of the systems discussed herein, such as system 100 in FIG. 1, system 1000 in FIG. 10, or system 1201 in FIG. 12, although variations are possible. Method 600 includes storing (601) sets of structured data records among the partitioned data storage spaces, with fields of the structured data records correlated among the sets by one or more relational associations. These data records can contain any data or set of data. In many of the examples herein, projects and tasks are discussed to provide exemplary data stored in the data records, with ones of the tasks associated with the projects. It should be understood than other data, data type, or data relationships can be employed.

Method 600 includes also includes receiving (602) change actions related to the structured data records. The change actions can be received into a user interface and interpreted by various processing systems or logic platforms. The change actions can comprise edits, renaming, deletions, relations, or other operations for the data records. Responsive to the change actions, the method includes establishing (603) data locks for portions of the structured data records based on the change actions to prevent further changes to the portions before execution of the change actions. These data locks can be established for the data records indicated by the change actions. In some examples, the data locks prevent modification or intervening changes to the associated data records by other processes or by users while the change actions are pending. It should be noted that further data locks are not established for further data records that reference the data records indicated in the change actions. For example, when the change actions indicate modifications to tasks, data locks might be placed on the tasks during change pendency for the tasks, but further data locks are not placed on projects that might reference or contain those tasks. Intervening edits to the projects can occur.

The method also includes scheduling execution (604) of the change actions in an execution index or reminder index. In some examples, once the change actions are scheduled, any associated data locks are removed to allow for intervening edits or changes to the associated data records while the change actions are pending in the reminder index. However, other examples can place data locks on the associated data records while the change actions are pending. Timing information, such a timer or time delay, can indicate when to execute the change actions, and this timing information is indicated in the change index for each of the associated data records. While the change actions are pending in the reminder index, intervening changes for at least further ones of the structured data records are allowed (605), such when the further ones of the data records reference or contain the data records indicated in the reminder index. These intervening changes can be resolved upon execution of the associated change actions. Change actions can be executed periodically (606), such as according to timing information stored with the change actions in the reminder index. Conflicts between change actions can be resolved without interaction of any original change submitter, such as a user or other data system.

In addition to the change actions for the data records indicated by the change actions, one or more rules can be established in the reminder index to affect other data records. For example, when tasks are indicated in the change actions, associated projects can have rules applied thereto when execution of the change actions for the tasks. In this manner, projects and associated data records are not locked and can receive further user changes during pendency of the associated tasks in the reminder index. The rules can include performing actions on the further or other data records once the change actions are executed for associated data records indicated in the reminder index. In the project-task regime, when change actions are pending for ones of the tasks, then rules can be established and included with the change actions in the reminder index. These rules can include modifying (such as deleting) projects which reference the tasks upon execution of the change actions for the tasks. Conversely, the rules can include modifying (such as deleting) tasks associated with a project upon execution of the change actions for the project. For example, when a project is deleted, rules can indicate that tasks that are associated with the project are also to be deleted.

Furthermore, the change actions, rules, and associated timing information can be queried directly from the reminder index. Information related to the change actions (such as change action information, task identifiers, timing information, and associated rules) can be transferred to a requestor responsive to a query. In this way, pending changes can be directly discovered by an associated data system instead of searching all data records to discover any pending changes attached to any data records in the data records themselves. Furthermore, promoted properties, as discussed above, can be included in the data records indicated by the change actions. These promoted properties can be employed during execution of the change actions to identify any parent data records, associated data records, or related data records or data record properties that might be affected by any rules or change actions.

Figure 7:
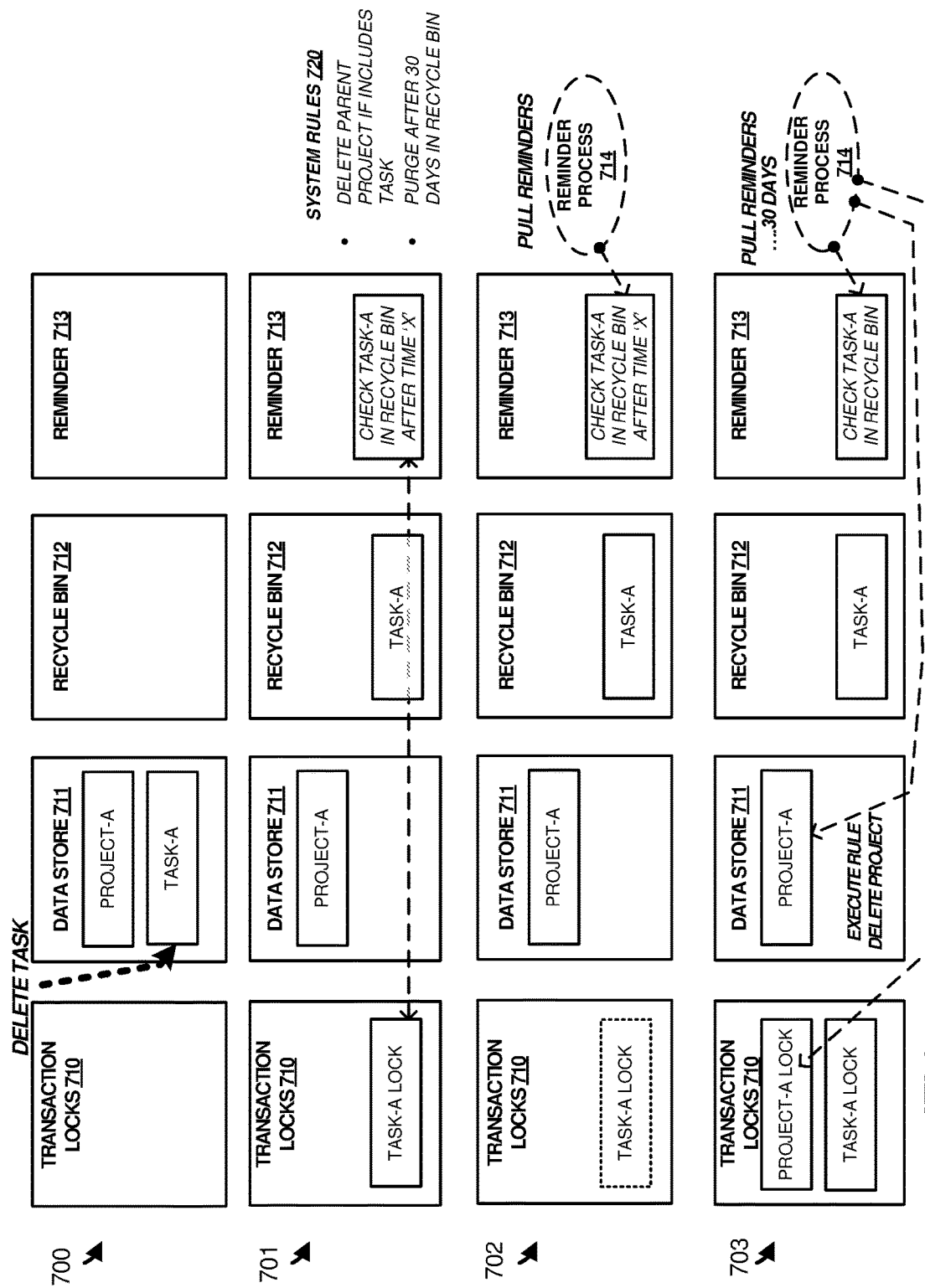
FIG. 7 illustrates change reminders in data records in an example.

To further illustrate change reminders and reminder indexes in project/task examples, FIG. 7 is presented. FIG. 7 illustrates change reminders in data records in an example. FIG. 7 illustrates reminders for processing in eventually consistent systems, and can be implemented on any of the systems discussed herein, such as system 100 in FIG. 1, system 1000 in FIG. 10, or system 1201 in FIG. 12, although variations are possible. FIG. 7 illustrates keeping an execution index in reminder index 713, so that a higher level timer system can periodically scan it and perform follow-up tasks. FIG. 7 illustrates a process including: (1) a reminder is created, based on logic, to make a stateful evaluation at some later specified time, and (2) a background process periodically queries for and executes these reminders. Such reminders in step (1) can allow for simulating "cascading" edits at a scope larger than the scope of transactional locking allowed for by the system, and may also allow for deferring edits later in time.

Operation 700 illustrates an action of moving task-A to recycle bin 712 that includes initially taking a change lock on the task. The change lock is included in transaction locks 710 during the placement of task-A into recycle bin 712 and establishment of a reminder in reminder index 713. Once task-A is placed into recycle bin 712 and the reminder in reminder index 713, the change lock for task-A can be released to allow intervening edits from other processes and users while task-A is in the recycle bin waiting for deferred purging. This example system has a timing rule that, after a predetermined number of days of having a target data record (i.e. task-A) in the recycle bin, a further data record that references the target data record should also be deleted (i.e. project-A). In this example, according to logical rules included in reminder index 713 for task-A, project-A (which contains task-A) is to be deleted after a predetermined amount of time that task-A is to remain in the recycle bin. System rules 720 indicate example logical rules for evaluating reminder operations related to task-A in recycle bin 712. Specifically, system rules 720 indicate that a data record (task-A) should be purged from the recycle bin after 30 days in the recycle bin, and any corresponding project that contains that task should be deleted. The system rules can be configured as global, per-record type (i.e. all tasks have similar rules), or specific to each record, including combinations thereof.

In operation 701, task-A is shown in recycle bin 712. Reminder index 713 also includes a reminder to check task-A again at a later time 'X'. After the configured amount of time passes for the reminder, the reminder process executes the reminder for task-A. FIG. 7 illustrates operation 702 with reminder process 714 periodically 'pulling' or checking reminders in reminder index 713 to determine if the time threshold of the rule is met, i.e. if 30 days have passed. FIG. 7 further illustrates operation 702 with reminder process 714 executing the associated rule by establishing a lock for the project associated with the task (project-A) and deleting project-A. Intervening edits may have been made to task-A or project-A because reminder process 714 or any associated deletion process did not hold onto the change locks for the task or project during any intervening time. Reminder process 714 can automatically resolve those intervening edits to ensure proper action is taken for the affected data records (i.e. deleting proper project data record and task data record). Intervening edits can include changes to project names, task names, or other various properties of the associated data records for projects and tasks which occurred when task-A waits for purging from recycle bin 712. In alternate examples, a change lock is held on task-A while task-A is in the recycle bin and until execution of the reminder for task-A. In these alternative examples, intervening changes to task-A are not allowed due to the transaction lock.

Turning now to FIGS. 8-11, enhanced data and change replication is discussed, among other features. Many data handling platforms and systems, such as those discussed herein, include more than one associated data center. In FIG. 1, multiple data centers are shown, and these can be located remotely or locally to each other. In some examples, the data centers comprise 'cloud' or distributed computing systems. However, difficulties can arise when replicating data changes across many data centers that handle sets of redundant data. In examples where all replicated edits are strongly ordered, processing might be difficult to parallelize. However, in the examples below, by giving up some measure of strong ordering, a system can achieve an enhanced level of parallelism. Advantageously, this idea improves the performance of asynchronous replication in data storage systems.

Data for a service can be stored in one data center, called the primary, and replicated to one or more other data centers (the secondary, tertiary, and so on). Changes and edits are typically received at the primary data center from users. Replication can be synchronous, where every edit is written to every replica before the edit is acknowledged to a user. Replication can instead be asynchronous, where an edit is acknowledged when it is received from a user by the primary, and only later written to the secondary.

Asynchronous replication needs to be ordered if data is to remain consistent on the replicas. For example, suppose that a document storage system allows changing the title of a document. A user edits a document with two updates: (A) set the title to "Revenue"; and (B) set the title to "Profits." The final effect is that the document title is set to "Profits." If these edits are then replicated to a secondary data center in an incorrect order, the edits will be run in this order: (B) set the title to "Profits"; and (A) set the title to "Revenue." If this happens, the title of the document will be different on the secondary and the primary, which is an error.

One way to handle the replication is to fully order updates. For example, every edit to every document in the storage system is given a sequence number, and the updates are run in the exact same order on the replica. Since all of the edits are strictly sequenced, none of them can be run in parallel. This can become a bottleneck if data center load increases. The examples herein trade some of the ordering for parallelism. Edits are grouped into "feeds" which are commutative with respect to each other, and edits are only guaranteed a relative order of execution on a per-feed basis. Commutativity refers to having updates from different feeds having the same outcome regardless of which is executed first, even if the updates may be for items logically related to each other. The quantity of feeds can be tuned to increase parallelism, which can improve performance, or tuned to increase the strength of ordering.

For example, in a system with tasks stored in projects, a task and its containing project may be in separate feeds. An update in the first feed may create the project, and the update in the second feed may create the task. At first glance, the task creation might not seem commutative with the project creation, because the project is the container for the task. Instead, by using a placeholder project if the task happens to be created first, and filling in the project with the correct details when it is fully created, the task can be created "out of order" such that the result is the same no matter which creation executed first. Since the outcome is the same regardless of which creation executes first, the two creations (project and task) are considered commutative.

There are many different ways to organize document/data edits into feeds. A first example structure is to divide documents which do not interact with each other into feeds based on hashing an identifier of the document. For example, a document storage subsystem can include edits to two documents that never interact with each other, i.e. the documents are independent. Suppose that in the primary data center, these edits are received:

Edit1) UserA edits Document1, setting the title to "Profits"
Edit2) UserB edits Document2, setting the title to "Morale"
Edit3) UserA edits Document1, setting the title to "Revenue"
Edit4) UserB edits Document2, setting the title to "Events."

To have the same results on the secondary (replica) data center, Edit1 must be executed before Edit3, and Edit2 must be executed before Edit4. But the relative orderings of edits to Document1 and to Document2 do not matter. Thus, the edits can be divided into feeds according to the associated documents, based on their identifiers:

Feed 1:
Edit1) UserA edits Document1, setting the title to "Profits".
Edit3) UserA edits Document1, setting the title to "Revenue".
Feed 2:
Edit2) UserB edits Document2, setting the title to "Morale".
Edit4) UserB edits Document2, setting the title to "Events".

The two feeds can now be executed in parallel on the secondary data center, and associated throughput is doubled.

Further example feed algorithms can group related documents together. For example, if editing a document should cause a cascading update to a subdocument, an implementation could mandate that the edit and the cascading update be in the same feed. Similarly, such as in examples that include tasks and projects, a "containment" or structural relationship can be modeled as commutative updates by using placeholder containers, allowing placeholder containers and contained objects to be in distinct feeds.

Various improvements to data verification, data set coherency checking, and data center management technology may be appreciated from the foregoing implementations. The ability of data center management systems to handle data verification efficiently using parallel feeds provides for enhanced operation of any associated data records, databases, and user interaction. Technical effects improve the functioning of computer and computer systems which might include databases, applications (such as project management applications), and data storage systems. This provides various technical effects and advantages by increasing the response time of data storage systems and reducing processor load and more efficient code execution for associated applications.

Figure 8:
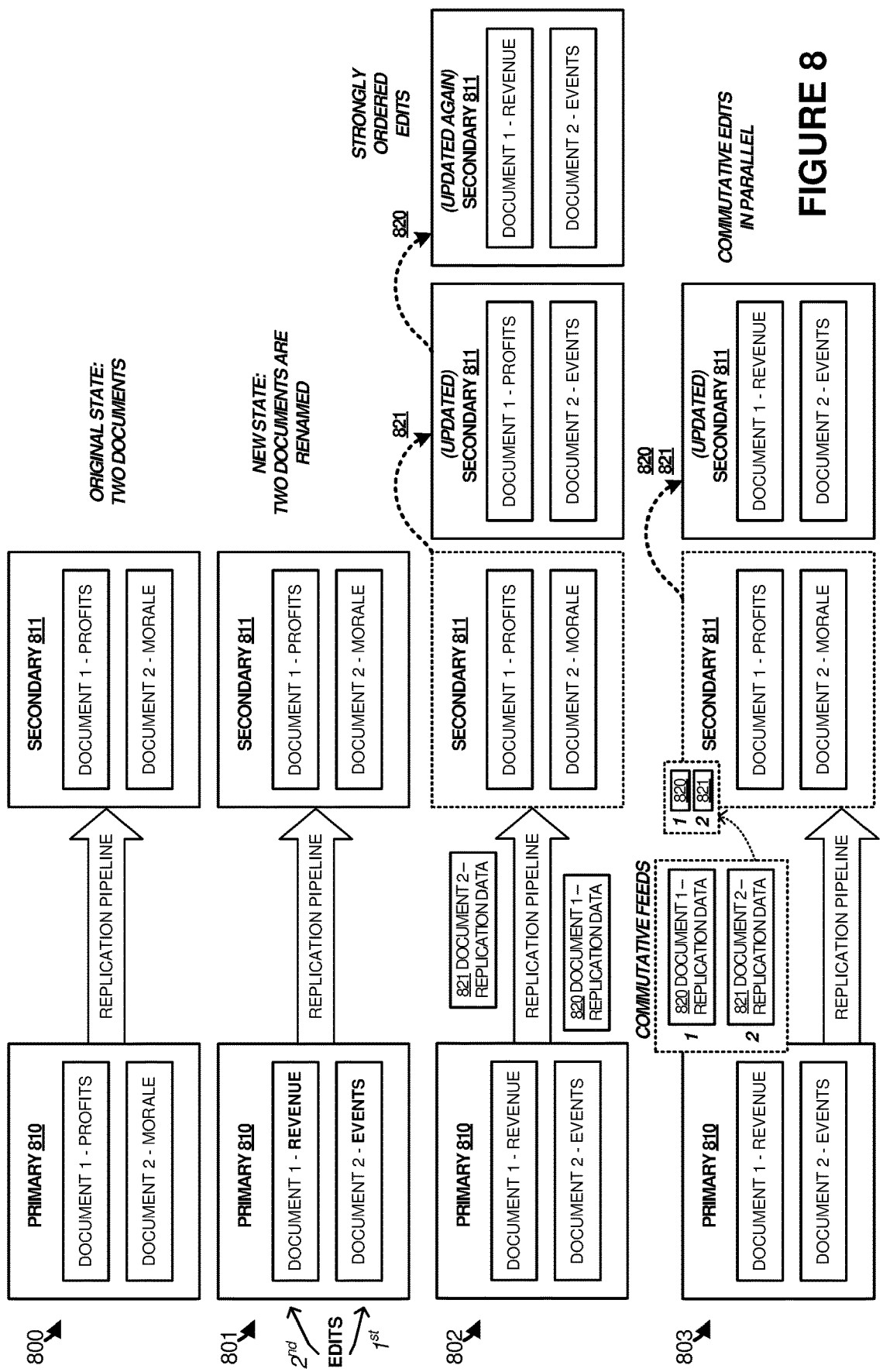
FIG. 8 illustrates replication ordering for data in an example.

Turning now to the operations of FIG. 8, operations 800-803 illustrate replication ordering for data in an example. FIG. 8 illustrates replication ordering in a cross-document eventual consistency system. In the examples shown in FIG. 8, document edits or data edits can be grouped into feeds, where operations in different feeds are fully commutative against each other. Feeds can be processed in parallel, granting performance increases without impacting data correctness. The number of feeds and the strength of ordering for edits are a scale on which optimizations can be made in each implementation of this idea.

FIG. 8 illustrates a method of managing changes among redundant data storage spaces. The method includes, across a plurality of data centers, redundantly storing sets of structured data records, with fields of the structured data records correlated among the sets by one or more relational associations. The method includes, in a first data center, receiving change actions related to the structured data records and selectively placing ones of the change actions into a plurality of change feeds, where the change feeds can be executed in parallel to implement the change actions. The method also includes propagating the change actions to ones of the data centers as operations ordered within each of the change feeds, wherein each of the data centers implement the change actions in the change feeds in parallel to affect the structured data records stored by the associated data center.

In operation 800, two documents are first in an original state, namely document 1 "profits" and document 2 "morale." These documents are replicated from primary 810 to secondary 811, as shown by the replication pipeline in operation 800 of FIG. 8. The documents are then renamed in operation 801, such as responsive to user commands to edit the names in the $1^{st}$ and $2^{nd}$ edits. Primary data center 810 can place change actions related to the edits in one or more commutative change feeds for implementation of the change actions in parallel in primary data center 810. Further details regarding the change feeds are discussed in operation 803 below. Once the change actions are implemented, primary data center 810 transfers replication data to one or more redundant data centers, such as secondary data center 811. This replication data can include indications of the change actions, edits, or other information for altering the structured data records. The change actions can be indicated in the replication data as being within one or more change feeds. Additionally, this replication data can include checksum or hash data which is used to verify completion of the change actions in the redundant data centers. The hash data compared to a hash generated on a data record (or portion thereof) after implementation of the accompanying change actions. If a mismatch occurs, then the change actions might not have been performed correctly. A further discussion of this hash comparison is found in FIG. 9 below. Primary data center 810 can generate this hash data related the state of the structured data records after implementing the change records. Further examples of the hash data are included in FIG. 9.

Operation 802 shows a traditional system where all edits are strongly ordered, creating a bottleneck. Specifically, edit 820 and edit 821 are propagated to secondary 811 in a sequential order. This order is typically the order in which the edits are received by primary 810, and thus edits 820 and

821 are replicated to secondary 811 as seen in FIG. 8. Operation 803 illustrates an enhanced operation using feeds. Advantageously, in operation 803, edits are bucketed such that edits in each bucket are commutative, and can be run in parallel. Commutative feeds can execute in parallel with each other so that feeds can be executed in any order as compared to other feeds, but change actions within a particular feed are executed in order. In this example, operations renaming distinct documents are commutative, and edits 820 and 821 occur in parallel. Replication data transferred by primary data center 810 indicates edits 820 and 821 to secondary data center 811, and this replication data indicates the edits as being within one or more commutative feeds, such as shown in FIG. 8.

Figure 9:
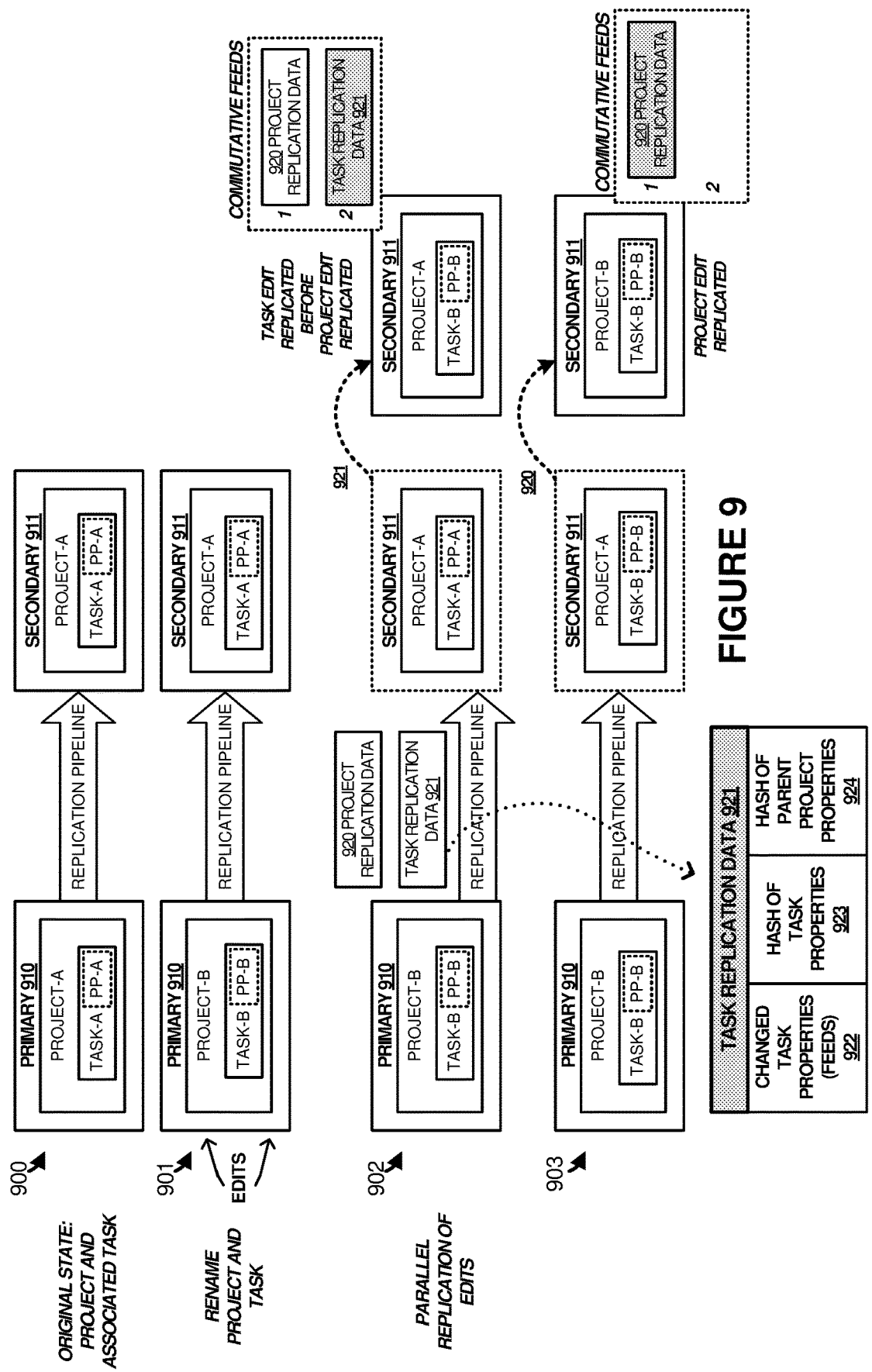
FIG. 9 illustrates verification of data changes in an example.

FIG. 9 illustrates verification of data changes in an example, which can be included along with commutative feeds as seen in FIG. 8. FIG. 9 illustrates immediate and eventual verifications in multi-document replication. FIG. 9 also illustrates a method of managing coherency among partitioned data storage spaces. The method includes storing sets of structured data records among the partitioned data storage spaces, with fields of the structured data records correlated among the sets by one or more relational associations, receiving change actions related to the structured data records and selectively placing ones of the change actions into a plurality of change feeds, where the change feeds can be commutatively executed in parallel to implement the change actions. The method also includes, while implementing the change actions in associated change feeds, performing consistency verifications of first ones of the change actions upon completion of each of the first ones of the change actions, and selectively delaying consistency verifications of second ones of the change actions until at least subsequent change actions are performed that affect similar structured data records. In some examples, the delayed consistency verifications can be optionally ignored once selectively delayed.

Turning now to the operations of FIG. 9, operation 900 shows a project (project-A) and a contained task (task-A) in an original state in primary data center 910. This original state can be established by a user to create a project and add one or more tasks to that project. Project-A and associated task-A are then replicated to secondary data center 911. In operation 901, the project and task are renamed, such as responsive to user input received at primary data center 910. Similar to the operations of FIG. 8, the renaming edits can be placed into commutative feeds in primary data center 910, implemented in primary data center 910, and replicated to secondary data center 911. The project and task edits are replicated to secondary data center 911, as seen in operation 902 for project replication data 920 and task replication data 921. The replication of the two associated edits 920/921 (project and task names) to secondary data center 911 is done in parallel, such as in commutative feeds established by primary data center 910. As seen in operation 902, the task renaming may replicate to secondary data center 911 before its containing project renaming replicates.

Task replication data 921 expanded in detail in FIG. 9. This task replication data can be representative of the replication data discussed for projects and replication data discussed in FIG. 8, although variations are possible. For example, the hash data might be omitted in some examples. In this example, task replication data 921 includes a description of the changes associated with renaming the task, such as a new task name, which is indicated in change task properties 922. Change task properties 922 can also indicate associated change feeds or commutative feeds into which changes are arranged. Task replication data 921 also includes one or more hashes, namely "hash of all task properties 923" and "hash of all parent project properties 924." These hashes comprise hash checksums in this example, and can be calculated using various hashing processes. In FIG. 9, all edits to a task are strictly sequenced, and the task hash must match. The parent project hash only needs to opportunistically match, because as shown above, it may not be fully replicated when the task changes replicate.

A further discussion of the replication and verification process using hashes follows. FIG. 9 illustrates "immediate" or "consistent" verifications that can be done immediately upon replication for properties which depend only on the replication of a single document, and "eventual" verifications that are tried immediately upon replication, but can be retried later if they may be relying on a document which has not replicated yet. This example illustrates the two kind of hashes that can be sent along with replicated records, namely hashes 923 and 924. Consistent/immediate hashes verify properties homed on or intrinsic to a data record, which are immediately verified for correctness/consistency. Eventual hashes can include promoted properties included in a data record, and verification may first need other records (which may be replicated in different feeds) to be processed before the hashes will match. In this example, hash 923 comprises a consistent/immediate hash type, and hash 924 comprises an eventual hash type.

Large distributed or cloud data services often have a single data center, called the primary. Collections of data (here called "documents) are then replicated to other data centers, like a secondary, a tertiary, and so on. This allows for traffic to "fail over" to another data center if the primary is unresponsive. The two major styles of replication are synchronous (in which edits are written to all replicas before they are acknowledged) and asynchronous (in which edits are acknowledged and later replicated). Asynchronous systems are often used because they are faster and more fault tolerant. Synchronous systems have to wait for acknowledgement of edits on multiple replicas, and cannot be successful if the majority of replicas are not responsive. But one of the main disadvantages of asynchronous systems is that replication is difficult to implement correctly. It is possible for several categories of bugs to result in document data loss or corruption when asynchronously replicating documents. This is true regardless of whether updates are sent as "deltas" (changes) or as full documents on every edit. The examples in FIG. 9 show various ways to detect lost or corrupted documents using the hashing scheme and both immediate and eventual verifications.

In some systems, periodic checksums are sent of documents during replication, so that the replica can check if all of its documents match. For example, the bytes of every field in every record can be merged together into a single value via a hash function, and the hashes can be compared between data centers. However, this constrains replication to be run in a single "feed," meaning that all replicated edits must be strongly ordered. Having edits strongly ordered means that they cannot be run in parallel, reducing throughput. Advantageously, in the examples herein, changes to documents are distributed across multiple feeds in such a way that their edits do not interact with each other. However, this can lead to edits for multiple documents which can occur in a different order in the primary data center and in the secondary data center.

If edits happen in a different order in the secondary data center, and then a checksum or hash is evaluated, the intermediate state in the secondary data center may not match the intermediate state of the primary data center. This is especially relevant for "promoted properties" discussed herein, which comprise properties or attributes of one document that are available in another document, reflecting properties that are reflected across a foreign-key association. For example, in a task management system, the title of a project may be "promoted" to a task contained by that project, so that the promoted property is available when reading the task, and the promoted property is available across the foreign-key association of containment. The final state of the task is that the task has been created and also has the project title promoted to a field of the task. However, replication/creation of the task and the creation of the project can happen in either order on the secondary data center.

Further, single-feed approaches typically have each data center periodically "frozen," and not accepting edits while checksums are computed. The frozen state indicates that the primary data center stops accepting edits for a duration sufficient to compute a checksum, and the secondary data center needs to process the same edits and pause processing a duration sufficient to compute and compare the checksum. An advantage of the examples herein using multiple feeds lies in 'when' to check properties of replicated objects, in part because although edits across multiple documents are not strongly ordered, edits to a single document are strongly ordered. The examples herein make a distinction between "Immediate" or "Consistent" verifications, and "Eventual" verifications Immediate verifications are verifications of fields that can only depend on a single object, and can be evaluated every time the relevant objects are replicated.

Consider, for example, an example system, such as found in FIG. 9, with projects that contain tasks, where both the tasks and projects have names. However, in this example, the task object has at least two fields that are returned when a task is read: the task name (an intrinsic field), and the project name (a promoted property field, indicated by 'PP-x' in FIG. 9). The project name is promoted to the task (i.e. a property of the project, not of the task). In operation 900, task-A shows a data field with a promoted property comprising the name of a project that includes task-A, namely "PP-A" which represents the name of the project (project-A). An edit is made to the task name and the project name, from "-A" to "-B," and the associated data record properties are changed. Specifically, project-A is renamed to project-B, where the project name is an intrinsic property or intrinsic data field of the project. Task-A is also renamed, to task-B, and the task name is an intrinsic property or intrinsic data field of the task. The promoted property included in the task which reflects a property of the project data record should also be updated to reflect the edit to the project name, and thus operation 901 shows "PP-B" resulting in task-B.

In FIG. 9, redundant data centers are employed, and any changes received at primary data center 910 are replicated to secondary data center 911. When an edit to the task is replicated to a secondary data center, the task name can be verified to ensure the replication of the edit is correct in the secondary data center. This is an example of an Immediate verification: the values of all immediately-verifiable properties are hashed together whenever an associated edit is performed on the primary data center, and when the edit is later executed on the secondary data center, the hash is re-computed. If the two hashes do not match, there is an error, and corrective action may be taken (such as alerting an error to a user) or waiting predetermined amount of time an attempting an associated hash comparison again. If the two hashes match, there is no error and the change/edit was replicated corrected to the secondary data center.

An Eventual verification is a verification of a field whose values depend on other objects. In the examples of project/tasks discussed herein, the project name as promoted to the task (i.e. "PP-x") is an example of a field in the task that depends on another object and Eventual verification can be performed on changes/edits to the project name (as contained in the field of the associated task). When the task and the project are replicated independently, such as in different feeds, uncertainty can arise whether the edited properties will match when the edit to the task is evaluated on both the primary data center and the secondary data center.

Consider this sequence for a primary data center:
The Project is created, with name ProjectA.
The Task is created, with name Task1, and has the promoted project title ProjectA included. The Immediate verification hash is performed just with the value Task1, and the Eventual verification hash is performed just with the value ProjectA.
The Project is renamed to ProjectB.

On the secondary data center, the sequence might replicate like this:
The Project is created, with name ProjectA.
The Task is created, with name Task1, and has the promoted project title ProjectA. The Immediate verification hash is performed just with the value Task1, and the Eventual verification hash is performed just with the value ProjectA.
The Project is renamed to ProjectB.

In the sequences above, the Immediate and Eventual hashes will match on both data centers. However, the project and the task can replicate in a different order with respect to each other, and on the secondary data center the sequence might instead replicate like this:
The Project is created, with name ProjectA.
The Project is renamed to ProjectB.
The Task is created, with name Task1, and has the promoted project title ProjectB. The Immediate verification hash is performed just with the value Task1, and the Eventual verification hash is performed just with the value ProjectB.

In the case above, the rename of the project has been swapped with the task creation. The result is that the Immediate hash still matches for the task names, but the eventual hash does not initially match for the project names. The Immediate hash (which must never fail, else report an error) has been made distinct from the Eventual hash (which may initially fail for legitimate reasons, but pass at a later time). In some cases, Eventual hash failures can be ignored and Immediate hash failures lead to an error. In other cases, failing Eventual hashes can be handled by any of the following: (1) watching for further replicated edits which may resolve the mismatch, (2) raising an alert if the mismatch is not resolved after a specified amount of time, or (3) resetting a timer each time an edit is seen for a document or a document in a promoted-properties relationship changes. Stating (3) another way, an alert can be raised if the data is still inconsistent and the amount of time since an edit was seen exceeds the expected replication delay of the system. To resolve Eventual hash failures, the secondary data center can check with the primary data center to directly to resolve the mismatch, request a resend of the associated replication data or hashes, or collect associated statistics to watch for trends that may indicate issues with replication, including combinations thereof.

Thus, the examples above discuss various improvements to data verification, data set coherency checking, and data center management technology which may be appreciated from the foregoing implementations. The ability of data center management systems to handle data verification efficiently using parallel feeds with immediate and deferred verification provides for enhanced operation of any associated data records, databases, and user interaction. Technical effects improve the functioning of computer and computer systems which might include databases, applications (such as project management applications), and data storage systems. This provides various technical effects and advantages by increasing the response time of data storage systems and reducing processor load and more efficient code execution for associated applications.

Figure 10:
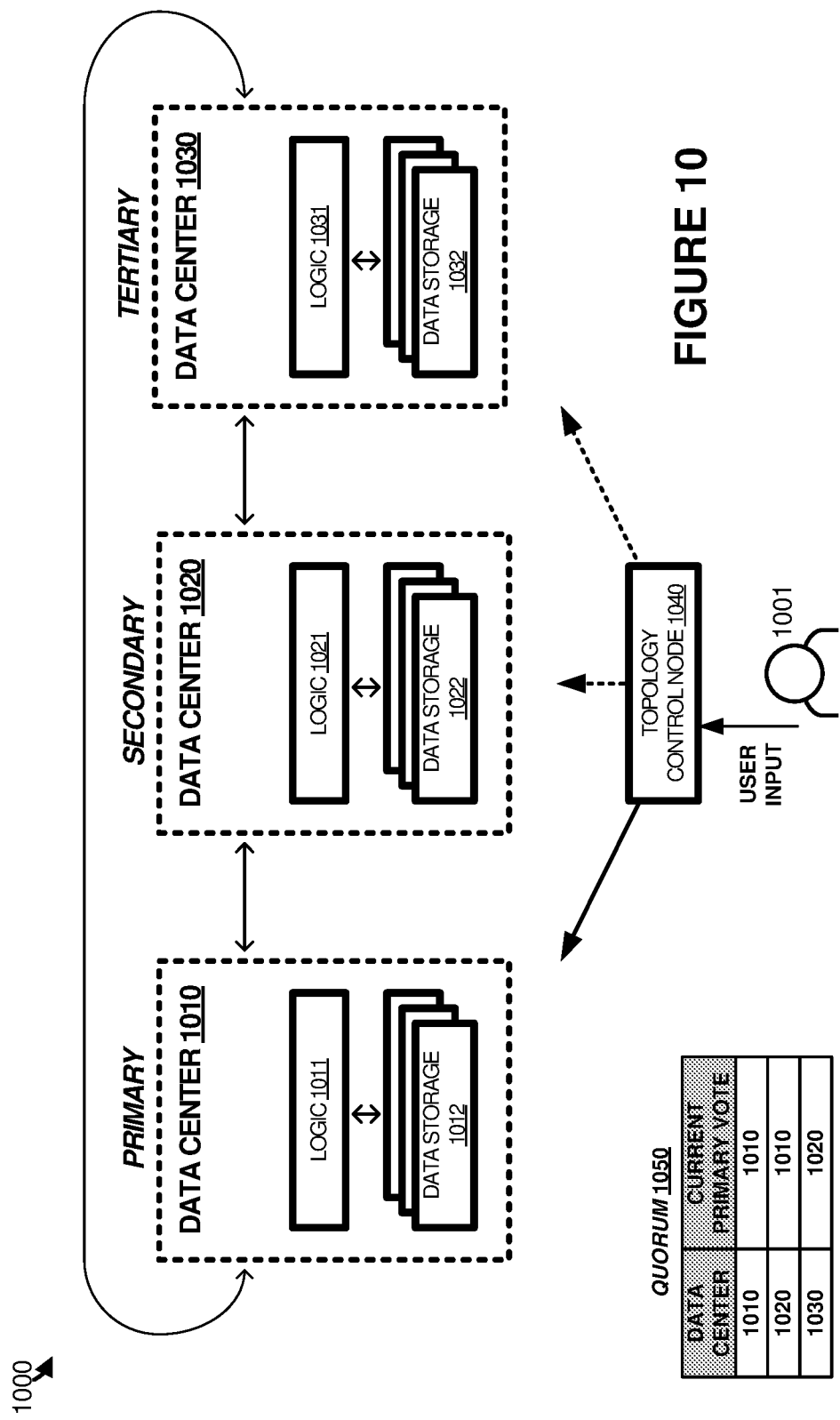
FIG. 10 illustrates a data storage environment in an example.
Figure 11:
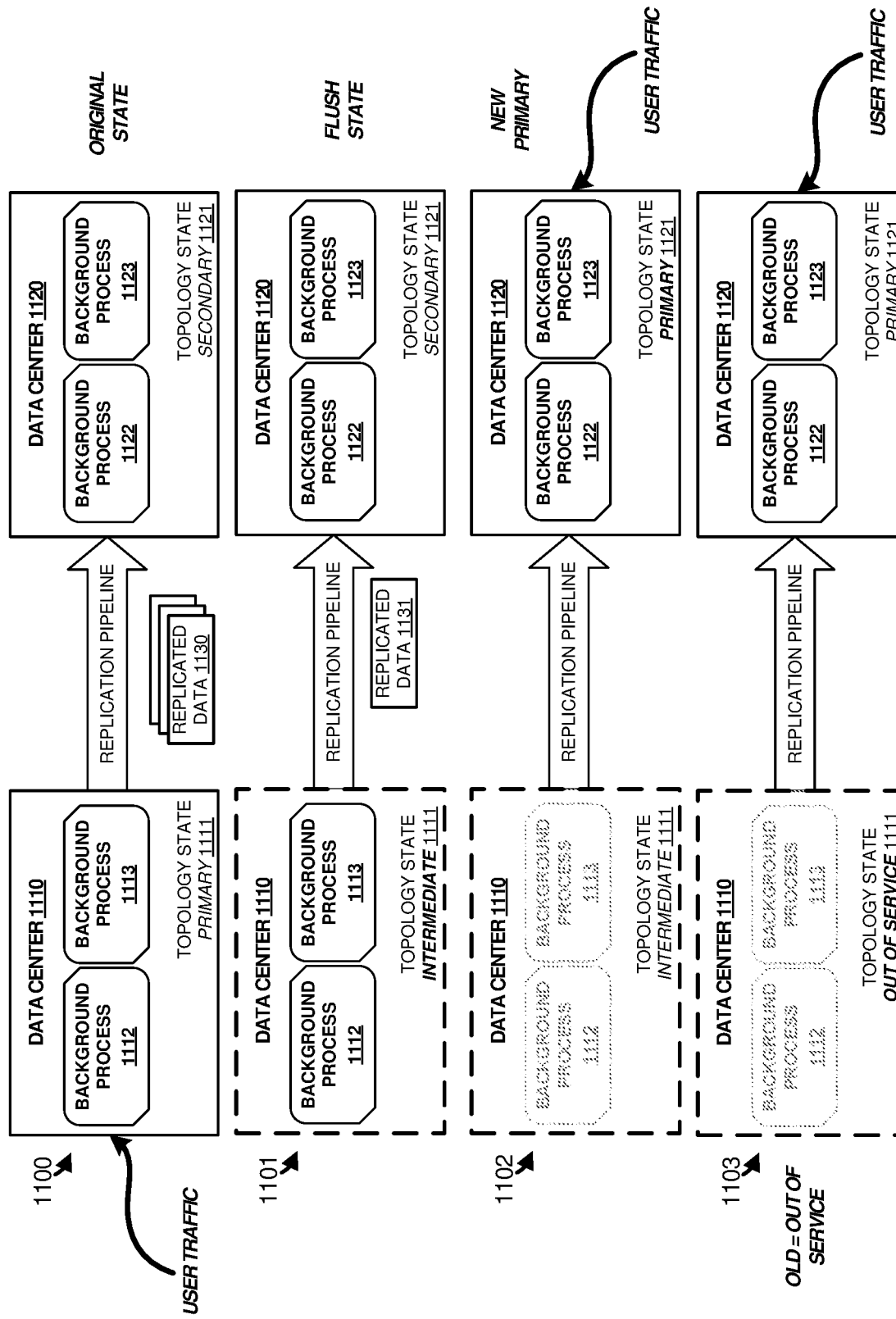
FIG. 11 illustrates control of data centers in an example.

As mentioned above, large distributed data services often have a primary data center. Collections of data (herein called "documents") are then replicated to other data centers, like a secondary, a tertiary, and so on. This allows for data center traffic to "fail over" to another data center if the primary is destroyed. FIGS. 10 and 11 illustrate example data storage environments for replication control via topology state.

FIG. 10 illustrates system 1000. System 1000 includes three data centers 1010, 1020, and 1030, as well as topology control node 1040. These data centers can include similar elements as discussed in FIG. 1, although variations are possible. For example, data center 1010 includes logic 1011 and data storage 1012, data center 1020 includes logic 1021 and data storage 1022, and data center 1030 includes logic 1031 and data storage 1032. Each of the data centers in FIG. 10 are communicatively coupled by one or more network links which can be coupled over one or more packet networks. In some examples, the data centers are located in geographic locations remote from each other and coupled via the Internet or other distributed networks. Each of the data centers in FIG. 10 provide redundant storage of data records in associated data storage elements. Initially, FIG. 10 shows a first data center (1010) designated as a primary data center, a second data center (1020) designated as a secondary data center, and a third data center (1030) designated as a tertiary data center. User input and user interaction is handled by the primary data center, as routed by topology control node 1040. As will be discussed below, enhanced operation is provided to change status designations among the data centers.

An example of operation of FIG. 10 can include a method of managing redundant data storage centers. The method includes redundantly storing data records across the redundant data storage centers, with a first of the data storage centers operating as a primary data storage center configured to respond to at least user input related to the data records. Responsive to designating a second of the data storage centers as the primary data storage center, the method includes placing the first of the data storage centers into an intermediate mode which ceases response to the user input by the first of the data storage centers, and in the first and the second of the data storage centers, executing pending operations related to previous user input received by the first of the data storage centers. The method also includes designating the second of the data storage centers as the primary data storage center configured to respond to at least further user input related to the data records. In some examples, designating the second of the data storage centers as the primary data storage center comprises determining a quorum among each of the data storage centers to designate the second of the data storage centers as the primary data storage center. When the first of the data storage centers is in the intermediate mode, the first of the data storage centers can operate in a read-only mode. In further examples, once the first of the data storage centers completes all of the pending operations, the first of the data storage centers can be placed into an out-of-service mode.

FIG. 11 illustrates example processes for changing states among data centers, and the operations of FIG. 11 can also be applied to the elements of FIG. 10. In operation 1100, data centers 1110 and 1120 are in an original state with an original primary data center 1110 and original secondary data center 1120. Further data centers can be included, but are omitted in FIG. 11 for clarity. Topology state 1111 indicates that data center 1110 is set to primary and topology state 1121 indicates that data center 1121 is set to secondary. Background processes 1112, 1113, 1122, 1123 each handle various functions of the associated data center, such as receiving and implementing changes/edits, replicating data, checking hashes, issuing alerts/errors, among other functions. Primary data center 1110 receives user traffic, such as edits, changes, additions, deletions, queries, or other data operations. Replicated data 1130 is generally transferred from primary data center 1110 to secondary data center 1120, or other data centers, responsive to changes made to data managed in primary data center 1110.

In operation 1101, the process of changing which data center is the primary is initiated. This process can be initiated responsive to outages, problems, or unresponsiveness detected for the current primary data center, responsive to instructions by a control node or administrator to initiate the process in anticipation of an outage or maintenance of the primary data center, or periodically after the primary data center has been a primary for a predetermined quantity of time, among other initiation triggers. Original primary data center 1110 is first set to an intermediate state which waits for background processes 1112-1113 to exit and for associated data to flush, such as replicated data 1131 to be replicated to data center 1120. Topology state 1111 indicates that data center 1110 is set to intermediate and topology state 1121 indicates that data center 1121 is set to secondary.

In operation 1102, another data center 1120 is set as the primary so that data center 1120 starts accepting user traffic. Topology state 1111 indicates that data center 1110 is set to intermediate and topology state 1121 indicates that data center 1121 is set to primary. Data center 1102 can begin accepting user traffic and implementing data processes responsive to the user traffic. Changes/edits to the data can be further replicated from data center 1120 to other data centers not shown in FIG. 11. In operation 1103, the old primary data center 1110 is set to an out of service state in topology state 1111, and data center 1120 remains in the primary state. Once maintenance or repairs are complete to data center 1110, the primary designation can be changed back to data center 1110 or remain with data center 1120. The out of service state prevents data center 1110 from receiving user input from users and any replication data from the current primary data storage center.

In FIG. 11, background processes and other state-specific actions, like accepting user traffic, can be controlled by a single topology control node. Unplanned failover is achieved using extension of the process in FIG. 11 instead of an extensive special case. For example, loss of control of a primary data center can be handled with a quorum system to establish the data center state. Specifically, remaining data centers can 'vote' to establish that a primary data center has become unresponsive or entered into an inactive state. A new primary data center can be selected among the remaining data centers based on a predetermined ordering or other factors, such as performance, capacity, or latency factors.

Advantageously, the processes in FIGS. 10 and 11 efficiently manage the background operations of a replicating distributed data service. A replicating distributed data service comprises a data service that stores data in one data center (the primary) and replicates the data to another data center (the secondary) and optionally replicates the data to others (like a tertiary). If the primary data center is disabled, traffic can be routed to the secondary data center (referred to as "failing over" or "performing a failover").

Topology refers to the set of datacenters and associated states, including which datacenter is a primary, secondary, and the like. Thus, topology includes information indicating which data center is currently the primary and which is the secondary. Data centers can be largely similar in terms of hardware and software composition, but one has been designated as the primary data center in the topology control node. Each role may have different associated jobs that need to be run. For example, the primary data center needs to export replication data, and the secondary data center needs to import replication data. Keeping these jobs in sync with the topology control node is important. For example, an error can arise to make a data center a primary but not run all of the jobs required of a primary data center. Similarly, only primary data centers typically can accept user traffic.

Some data center control schemes define steps for each possible state change from a Start state to a Finish state, such as: (A) Set the state to an intermediate state; (B) Stop each job which is run on the Start state; (C) Start each job which is run on the Finish state; (D) Set the state to Finish. Other data center topologies are more complicated for transitions which affect multiple data centers, like a failover. Consider the example steps from some data center topologies to move the Original data center from Primary to Out Of Service, and the New data center from Secondary to Primary: (A) Set the state of Original to Intermediate; (B) Stop each job on Original which pertains to Primary (there may be many jobs, so these could have many substeps); (C) Ensure data has flushed from Original to New; (D) Start each job on New which pertains to Primary; (E) Start each job on Original which pertains to Out Of Service; (F) Set Original to Out Of Service; (G) Set New to Primary.

The procedures described in the previous paragraph can be error-prone, in part because errors arise when two data centers run Primary jobs at the same time (or both accept user traffic). Also, the approach described in the previous paragraph has many explicit steps, which might be coded incorrectly. Downtime is minimized when one data center is running Primary jobs for as much of the time as possible. Further, an important aspect of state transitions for data centers is that they should be resilient to error, such as having the ability to be re-triable. The procedures described in the previous paragraph are typically special-cased (to flip or not flip many different control/network switches or topology control node settings) when the system is not working properly. When many switches are flipped one at a time, some processes might spend more time turned off than if controlled by a master switch. One such issue is the case of "unplanned failover," meaning that an associated replication pipeline is not flushing completely. When every subsystem is called independently to flush data, handling operations for one of the subsystems can be difficult to manage correctly. Another difficulty of the procedures described in the previous paragraph is the "loss of control" scenario, where a topology control node is unable to contact the primary data center to set its state. In an approach with many subsystems that have to have their state changed explicitly, the operational procedures might not account for one of them being unreachable.

An advantageous aspect of the examples herein is that all jobs are continuously evaluated by the job scheduler to see whether they should be running on the topology. A straightforward mapping from each job to the topology states in which it should be running is established, where the steps of starting and stopping jobs do not need to be encoded into data center state changes. Transitions which affect multiple data centers, like a failover, can also be efficiently handled. For example, a failover process to move an original Primary data center from Primary to Out of Service, and a new data center from Secondary to Primary is as follows:

(1) Set the state of the original Primary data center to Intermediate
(2) Wait for each job on the original Primary data center which pertains to the Primary data center to finish executing
(3) Ensure replication data has flushed from the original primary data center to the new primary data center
(4) Set the new data center to be the Primary data center
(5) Set the original Primary data center to Out of Service This preceding example has fewer steps than in other topologies and control schemes, in part because jobs do not need to be explicitly started for the new state as the job manager of the associated data centers will handle that. Also, stopping jobs merely includes waiting for those jobs to finish, so there are fewer state transitions and substeps which can complicate retry. This enhanced scheme also allows for a very simple mechanism for unplanned failover by having step (1) above simply omitted from the workflow. Different subsystems do not have to be accounted for, only a single settings switch is needed in the failover operation. Finally, this enhanced scheme allows for loss of control scenarios by omitting steps (1), (2), and (3) above. This allows the system to establish a new primary while an original primary is unresponsive.

However, the original primary should still be set to out of service (so that the original primary does not accept user traffic), and a further mechanism is included. This can be achieved by making a quorum system of the data centers (using three or more data centers in the topology). When a first data center believes it is the primary, the first data center periodically checks with other data centers in an associated topology to ensure that they agree. If more than half of the data centers agree that the first data center is primary, the first data center can continue acting as primary Otherwise, if more than half of the data centers think that the first data center is not primary or cannot be reached to give a vote, the first data center will automatically stop accepting user traffic. This also allows an operator to force the first data center to be out of rotation/use in a topology, even if the operator cannot reach the first data center, as long as the operator can reach more than half of the other data centers to inform them of the change. This greatly increases the resilience of the system.

One example quorum is shown in FIG. 10. FIG. 10 includes quorum 1050 which includes a vote from each of the data centers as to which data center is currently set as the primary data center. Two data centers currently indicate that data center 1010 is the primary and one data center currently indicates that data center 1020 is the primary. Thus, topology control node and the associated data centers operate according to data center 1010 as primary. If data center 1010 became unresponsive, then it would not provide a 'vote' and another data center could take over as primary. Likewise, topology control node 1040 can control which data center is the primary by reporting to each data center the selected primary designation. If one of the data centers fails to receive this designation initially, then the remaining data centers still can indicate the correct primary due to the quorum process. Each data center can exchange quorum data indicating current primary designations with the other data centers, and can receive topology state changes from topology control node 1040.

In these quorum examples, each data center will periodically check the quorum, such as by receiving quorum data from the other data centers or requesting the quorum data from the other data centers. If a currently non-primary data center, such as a secondary data center, receives quorum data that indicates the secondary data center is now a primary data center, then the secondary data center can change a corresponding state to primary from secondary and being to receive user traffic and replicate changes to other data centers. The quorum data can indicate a current 'vote' from each data center as to which data center is the primary, among other designations or states. The quorum data can indicate an identifier of the primary data center, such as a network identifier of a data center, unique identifier for a data center, or other designation. The quorum data can also include more than one designation, with a ranking of possible primary data centers.

Various improvements to replication control and data center management technology may be appreciated from the foregoing implementations. The ability of data center management systems to handle failover and role changes efficiently provide for enhanced operation of any associated data records, databases, and user interaction. Technical effects improve the functioning of computer and computer systems which might include databases, applications (such as project management applications), and data storage systems. This provides various technical effects and advantages by increasing the response time of data storage systems and reducing processor load and more efficient code execution for associated applications.

Figure 12:
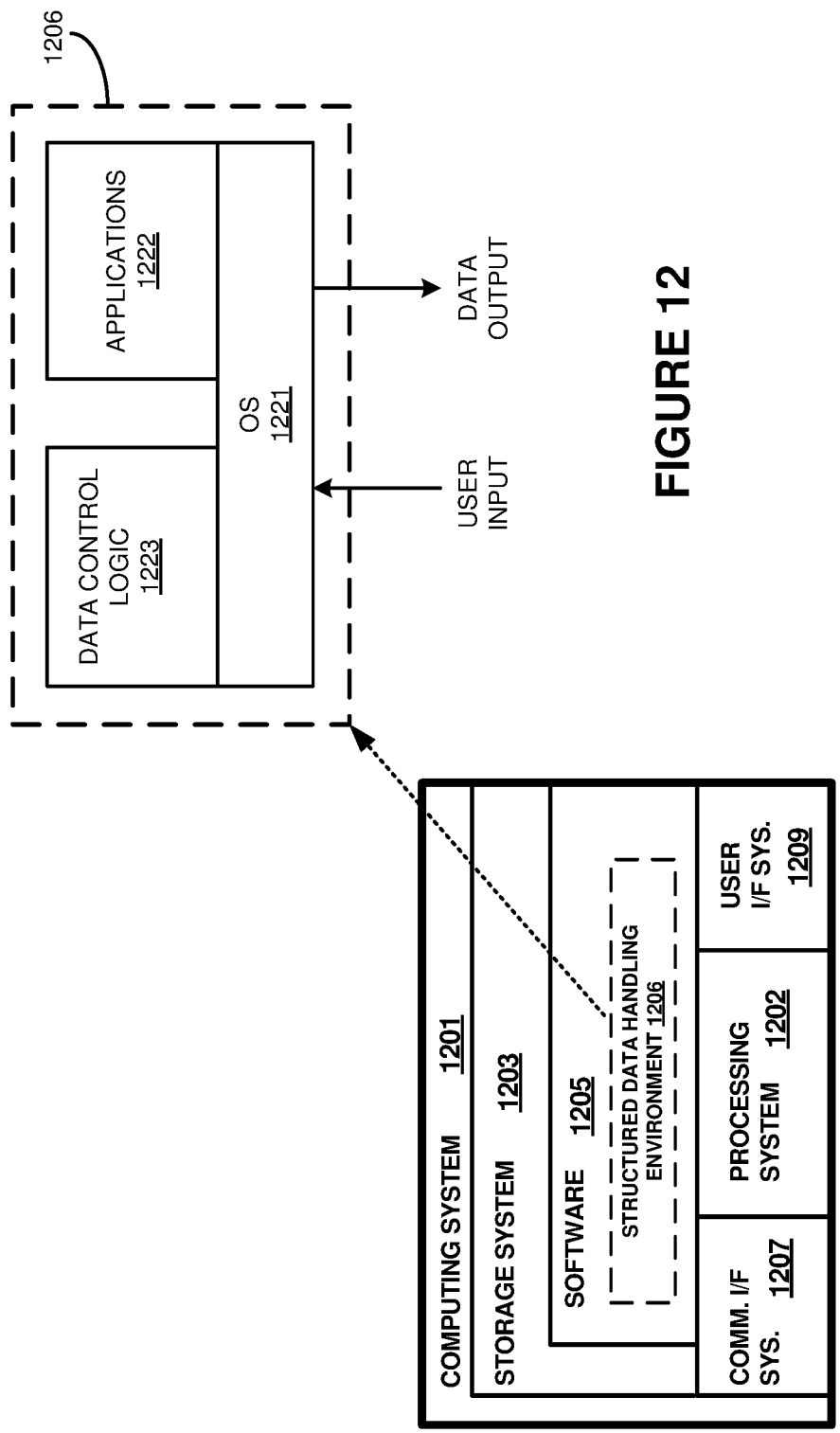
FIG. 12 illustrates a computing system suitable for implementing any of the architectures, processes, and operational scenarios disclosed herein.

FIG. 12 illustrates computing system 1201 that is representative of any system or collection of systems in which the various operational architectures, scenarios, and processes disclosed herein may be implemented. Examples of computing system 1201 include, but are not limited to, server computers, rack servers, web servers, cloud computing platforms, and data center equipment, as well as any other type of physical or virtualized server machine, and any variation or combination thereof. Computing system 1201 can be representative of elements of data centers 110-112 of FIG. 1, or data centers 1010, 1020, and 1030 of FIG. 10, although variations are possible.

Computing system 1201 may be implemented as a single apparatus, system, or device or may be implemented in a distributed manner as multiple apparatuses, systems, or devices. Computing system 1201 includes, but is not limited to, processing system 1202, storage system 1203, software 1205, communication interface system 1207, and user interface system 1208. Processing system 1202 is operatively coupled with storage system 1203, communication interface system 1207, and user interface system 1208.

Processing system 1202 loads and executes software 1205 from storage system 1203. Software 1205 includes structured data handling environment 1206, which is representative of the processes discussed with respect to the preceding Figures. When executed by processing system 1202 to enhance data record processing and data center handling, software 1205 directs processing system 1202 to operate as described herein for at least the various processes, operational scenarios, and sequences discussed in the foregoing implementations. Computing system 1201 may optionally include additional devices, features, or functionality not discussed for purposes of brevity.

Referring still to FIG. 12, processing system 1202 may comprise a micro-processor and processing circuitry that retrieves and executes software 1205 from storage system 1203. Processing system 1202 may be implemented within a single processing device, but may also be distributed across multiple processing devices or sub-systems that cooperate in executing program instructions. Examples of processing system 1202 include general purpose central processing units, application specific processors, and logic devices, as well as any other type of processing device, combinations, or variations thereof.

Storage system 1203 may comprise any computer readable storage media readable by processing system 1202 and capable of storing software 1205. Storage system 1203 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 1203 may also include computer readable communication media over which at least some of software 1205 may be communicated internally or externally. Storage system 1203 may be implemented as a single storage device, but may also be implemented across multiple storage devices or sub-systems co-located or distributed relative to each other. Storage system 1203 may comprise additional elements, such as a controller, capable of communicating with processing system 1202 or possibly other systems.

Software 1205 may be implemented in program instructions and among other functions may, when executed by processing system 1202, direct processing system 1202 to operate as described with respect to the various operational scenarios, sequences, and processes illustrated herein. For example, software 1205 may include program instructions for implementing enhanced data record processing and handling for data center operations.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1205 may include additional processes, programs, or components, such as operating system software or other application software, in addition to or that include environment 1206. Software 1205 may also comprise firmware or some other form of machine-readable processing instructions executable by processing system 1202.

In general, software 1205 may, when loaded into processing system 1202 and executed, transform a suitable apparatus, system, or device (of which computing system 1201 is representative) overall from a general-purpose computing system into a special-purpose computing system customized to facilitate enhanced data record processing and data center handling. Indeed, encoding software 1205 on storage system 1203 may transform the physical structure of storage system 1203. The specific transformation of the physical structure may depend on various factors in different implementations of this description. Examples of such factors may include, but are not limited to, the technology used to implement the storage media of storage system 1203 and whether the computer-storage media are characterized as primary or secondary storage, as well as other factors.

For example, if the computer readable storage media are implemented as semiconductor-based memory, software 1205 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Structured data handling environment 1206 includes one or more software elements, such as OS 1221, applications 1222, and data control logic 1223. These elements can describe various portions of computing system 1201 with which a user interacts or with which structured data records are managed over one or more data centers. For example, OS 1221 can provide software platforms on which user applications are executed and allow for receipt and handling of data records, changes to data records, and queries to sets of data records. User applications 1222 can be any application discussed herein, such as project management, planning, task management, calendaring, or any other data record handling application, and can include user interface elements. Data control logic 1223 provides for promoted properties in eventually consistent systems, reminders for processing in eventually consistent systems, replication feeds in a multi-document eventual consistency system, replication ordering in a cross-document eventual consistency system, immediate and eventual verifications in multi-document replication, and replication control via topology state, among other operations.

Communication interface system 1207 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media.

User interface system 1208 is optional and may include one or more network interfaces for exchanging user input related to queries, data records, changes to data records, or other input. User interface system 1208 can include other input devices and associated processing elements capable of receiving user input from a user. User interface system 1208 can provide output and receive input over a network interface, such as communication interface system 1207. User interface system 1208 may also include associated user interface software executable by processing system 1202 in support of the various user input and output devices discussed above. Separately or in conjunction with each other and other hardware and software elements, the user interface software and user interface devices may support a graphical user interface, a natural user interface, or any other type of user interface.

Communication between computing system 1201 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

Example 1

A method of operating a plurality of data centers that store structured data records, the method comprising, across the plurality of data centers, storing sets of the structured data records, with fields of the structured data records correlated among the sets by one or more relational associations. In a first data center that receives change actions related to the structured data records, the method includes selectively placing the change actions into a plurality of change feeds, where the change feeds can be commutatively executed in parallel to implement the change actions. In the first data center, the method includes implementing the change actions and propagating to at least a second data center replication data comprising the change actions indicated in the plurality of change feeds.

Example 2

The method of Example 1, further comprising, in the second data center, receiving the replication data comprising the change actions indicated in the plurality of change feeds and implementing the change actions in parallel according to the change feeds to affect the structured data records in the second data center.

Example 3

The method of Examples 1-2, further comprising, while implementing the change actions in associated change feeds, performing consistency verifications of first ones of the change actions upon completion of each of the first ones of the change actions, and selectively delaying consistency verifications of second ones of the change actions until at least subsequent change actions are performed that affect related structured data records.

Example 4

The method of Examples 1-3, further comprising, performing first hash comparisons for intrinsic data fields of the structured data records affected by the first ones of the change actions to perform the consistency verifications of the first ones of the change actions, and delaying second hash comparisons for promoted data fields of the structured data records affected by the first ones of the change actions.

Example 5

The method of Examples 1-4, where the promoted data fields comprise one or more properties of other structured data records which reference the structured data records affected by the first ones of the change actions.

Example 6

The method of Examples 1-5, further comprising, delaying the second hash comparisons for the promoted data fields of the structured data records affected by the first ones of the change actions until after completion of the second ones of the change actions that affect related structured data records.

Example 7

The method of Examples 1-6, where the replication data further comprises first hash data used in the first hash comparisons and second hash data used in the second hash comparisons.

Example 8

The method of Examples 1-7, further comprising, performing the second hash comparisons, and if failures arise in the second hash comparisons, ignoring the failures, and re-performing the second hash comparisons after waiting a predetermined time.

Example 9

The method of Examples 1-8, further comprising, in the first data center, generating hash data related a state of the structured data records after implementing the change records in the first data center, and including the hash data in the replication data.

Example 10

An apparatus comprising one or more computer readable storage media, and program instructions stored on the one or more computer readable storage media. When executed by a processing system, the program instructions direct the processing system to at least store structured data records, with fields of the structured data records correlated among by one or more relational associations. The program instructions direct the processing system to receive change actions related to the structured data records, and selectively place the change actions into a plurality of change feeds, where the change feeds can be commutatively executed in parallel to implement the change actions. The program instructions direct the processing system to implement the change actions and propagate replication data comprising the change actions indicated in the plurality of change feeds.

Example 11

The apparatus of Example 10, comprising further program instructions, when executed by the processing system, direct the processing system to at least implement the change actions according to the change feeds to affect the structured data records.

Example 12

The apparatus of Examples 10-11, comprising further program instructions, when executed by the processing system, direct the processing system to at least, while implementing the change actions in associated change feeds, perform consistency verifications of first ones of the change actions upon completion of each of the first ones of the change actions, and selectively delay consistency verifications of second ones of the change actions until at least subsequent change actions are performed that affect related structured data records.

Example 13

The apparatus of Examples 10-12, comprising further program instructions, when executed by the processing system, direct the processing system to at least perform first hash comparisons for intrinsic data fields of the structured data records affected by the first ones of the change actions to perform the consistency verifications of the first ones of the change actions, and delay second hash comparisons for promoted data fields of the structured data records affected by the first ones of the change actions.

Example 14

The method of Examples 10-13, where the promoted data fields comprise one or more properties of other structured data records which reference the structured data records affected by the first ones of the change actions.

Example 15

The apparatus of Examples 10-14, comprising further program instructions, when executed by the processing system, direct the processing system to at least delay the second hash comparisons for the promoted data fields of the structured data records affected by the first ones of the change actions until after completion of the second ones of the change actions that affect related structured data records.

Example 16

The method of Examples 10-15, where the replication data further comprises first hash data used in the first hash comparisons and second hash data used in the second hash comparisons.

Example 17

The apparatus of Examples 10-16, comprising further program instructions, when executed by the processing system, direct the processing system to at least perform the second hash comparisons, and if failures arise in the second hash comparisons, ignore the failures, and re-perform the second hash comparisons after waiting a predetermined time.

Example 18

A method of managing changes among redundant data storage spaces, the method comprising across a plurality of data centers, redundantly storing sets of structured data records, with fields of the structured data records correlated among the sets by one or more relational associations, and receiving change actions related to the structured data records and selectively placing ones of the change actions into a plurality of change feeds, where the change feeds can be commutatively executed in parallel to implement the change actions. The method includes propagating the change actions to ones of the data centers as operations ordered within each of the change feeds, where the ones of the data centers implement the change actions in the change feeds in parallel to affect the structured data records stored by the associated data center.

Example 19

The method of Example 18, further comprising, while implementing the change actions in associated change feeds, performing consistency verifications of first ones of the change actions upon completion of each of the first ones of the change actions, and selectively delaying consistency verifications of second ones of the change actions until at least subsequent change actions are performed that affect similar structured data records.

Example 20

The method of Examples 18-19, further comprising, performing first hash comparisons for intrinsic data fields of the structured data records affected by the first ones of the change actions to perform the consistency verifications of the first ones of the change actions, and delaying second hash comparisons for promoted data fields of the structured data records affected by the first ones of the change actions, where the promoted data fields comprise one or more properties of other structured data records which reference the structured data records affected by the first ones of the change actions.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method comprising:
  storing structured data records in a first data center, with fields of the structured data records correlated by one or more relational associations;
  responsive to change actions comprising conflicting edits of the structured data records, determining relative dependencies among the change actions to establish commutative operation providing parallel execution of change feeds for the first data center by selective placement of the change actions into the change feeds based at least on the relative dependencies such that first ones of the conflicting edits placed within same feeds employ immediate consistency verifications and second ones the conflicting edits placed in different feeds employ delayed consistency verifications;
  implementing the change actions directed to the structured data records stored by the first data center by at least executing, in the first data center, corresponding change actions in order within each of the change feeds and in any order between the different change feeds; and
  propagating to a second data center replication data comprising the change actions placed within the change feeds for execution of the change actions by the second data center.

2. The method of claim 1, further comprising:
  in the second data center, receiving the replication data and implementing the change actions in parallel according to placement in the change feeds to affect the structured data records stored by the second data center.

3. The method of claim 1, further comprising:
  for the change actions in associated change feeds, performing the immediate consistency verifications of the first ones of the change actions upon completion of each of the first ones of the change actions, and performing the delayed consistency verifications by at least selectively delaying consistency verifications of the second ones of the change actions until at least subsequent change actions are performed that affect related structured data records.

4. The method of claim 3, further comprising:
  performing first hash comparisons for intrinsic data fields of the structured data records affected by the first ones of the change actions to perform the immediate consistency verifications of the first ones of the change actions, and delaying second hash comparisons for promoted data fields of the structured data records affected by the first ones of the change actions.

5. The method of claim 4, wherein the promoted data fields comprise one or more properties of other structured data records which reference the structured data records affected by the first ones of the change actions.

6. The method of claim 4, further comprising:
  delaying the second hash comparisons for the promoted data fields of the structured data records affected by the first ones of the change actions until after completion of the second ones of the change actions that affect related structured data records.

7. The method of claim 6, wherein the replication data further comprises first hash data used in the first hash comparisons and second hash data used in the second hash comparisons.

8. The method of claim 4, further comprising:
performing the second hash comparisons, and if failures arise in the second hash comparisons, ignoring the failures, and re-performing the second hash comparisons after waiting a predetermined time.

9. The method of claim 1, further comprising:
generating hash data related a state of the structured data records after implementing the change records in the first data center, and including the hash data in the replication data.

10. An apparatus comprising:
one or more computer readable storage media;
program instructions stored on the one or more computer readable storage media that, when executed by a processing system, direct the processing system to at least:
store structured data records, with fields of the structured data records correlated among by one or more relational associations;
responsive to change actions comprising conflicting edits of the structured data records, determine relative dependencies among the change actions to establish commutative operation providing parallel execution of change feeds for the first data center by selective placement of the change actions into the change feeds based at least on the relative dependencies such that first ones of the conflicting edits placed within same feeds employ immediate consistency verifications and second ones the conflicting edits placed in different feeds employ delayed consistency verifications;
implement the change actions directed to the structured data records by at least executing, in the first data center, corresponding change actions in order within each of the change feeds and in any order between the different change feeds; and
propagate replication data comprising the change actions placed within the change feeds for execution of the change actions by a second data center.

11. The apparatus of claim 10, comprising further program instructions, when executed by the processing system, direct the processing system to at least:
implement the change actions in parallel according to placement in the change feeds to affect the structured data records.

12. The apparatus of claim 10, comprising further program instructions, when executed by the processing system, direct the processing system to at least:
for the change actions in associated change feeds, perform the immediate consistency verifications of the first ones of the change actions upon completion of each of the first ones of the change actions, and perform the delayed consistency verifications by at least selectively delaying consistency verifications of the second ones of the change actions until at least subsequent change actions are performed that affect related structured data records.

13. The apparatus of claim 12, comprising further program instructions, when executed by the processing system, direct the processing system to at least:
perform first hash comparisons for intrinsic data fields of the structured data records affected by the first ones of the change actions to perform the immediate consistency verifications of the first ones of the change actions, and delay second hash comparisons for promoted data fields of the structured data records affected by the first ones of the change actions.

14. The apparatus of claim 13, wherein the promoted data fields comprise one or more properties of other structured data records which reference the structured data records affected by the first ones of the change actions.

15. The apparatus of claim 13, comprising further program instructions, when executed by the processing system, direct the processing system to at least:
delay the second hash comparisons for the promoted data fields of the structured data records affected by the first ones of the change actions until after completion of the second ones of the change actions that affect related structured data records.

16. The apparatus of claim 15, wherein the replication data further comprises first hash data used in the first hash comparisons and second hash data used in the second hash comparisons.

17. The apparatus of claim 13, comprising further program instructions, when executed by the processing system, direct the processing system to at least:
perform the second hash comparisons, and if failures arise in the second hash comparisons, ignore the failures, and re-perform the second hash comparisons after waiting a predetermined time.

18. A method comprising:
across a plurality of data centers, redundantly storing structured data records, with fields of the structured data records correlated among the structured data records by one or more relational associations;
responsive to change actions comprising conflicting edits of the structured data records, for each data center, determining relative dependencies among the change actions to establish commutative operation providing parallel execution of change feeds by selective placement of the change actions into the change feeds based at least on the relative dependencies such that first ones of the conflicting edits placed within same feeds employ immediate consistency verifications and second ones the conflicting edits placed in different feeds employ delayed consistency verifications;
propagating the change actions to selected data centers as operations placed within each of the change feeds, wherein the selected data centers responsively implement corresponding change actions in each of the plurality of data centers in order within each of the change feeds and in any order between the different change feeds to affect the structured data records stored by the selected data centers.

19. The method of claim 18, further comprising:
for the change actions in associated change feeds, performing the immediate consistency verifications of the first ones of the change actions upon completion of each of the first ones of the change actions, and performing the delayed consistency verifications by at least selectively delaying consistency verifications of the second ones of the change actions until at least subsequent change actions are performed that affect similar structured data records.

20. The method of claim 19, further comprising:
performing first hash comparisons for intrinsic data fields of the structured data records affected by the first ones of the change actions to perform the immediate consistency verifications of the first ones of the change actions, and delaying second hash comparisons for promoted data fields of the structured data records affected by the first ones of the change actions, wherein the promoted data fields comprise one or more properties of other structured data records which reference the structured data records affected by the first ones of the change actions.

\* \* \* \* \*